US010744416B2

(12) United States Patent
Amaitis et al.

(10) Patent No.: US 10,744,416 B2
(45) Date of Patent: Aug. 18, 2020

(54) MULTI-PROCESS COMMUNICATION REGARDING GAMING INFORMATION

(71) Applicant: INTERACTIVE GAMES LLC, New York, NY (US)

(72) Inventors: Lee Amaitis, Palm Beach Gardens, FL (US); Paul Williams, Las Vegas, NV (US); Sunny Tara, Henderson, NV (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

(21) Appl. No.: 16/531,298

(22) Filed: Aug. 5, 2019

(65) Prior Publication Data

US 2019/0358548 A1 Nov. 28, 2019

Related U.S. Application Data

(63) Continuation of application No. 14/622,325, filed on Feb. 13, 2015, now Pat. No. 10,406,446, which is a continuation of application No. 13/070,893, filed on Mar. 24, 2011, now Pat. No. 8,956,231.

(60) Provisional application No. 61/373,435, filed on Aug. 13, 2010, provisional application No. 61/405,309, filed on Oct. 21, 2010, provisional application No. 61/405,439, filed on Oct. 21, 2010, provisional application No. 61/413,098, filed on Nov. 12, 2010, provisional application No. 61/413,089, filed on Nov. 12, 2010.

(51) Int. Cl.
*A63F 13/87* (2014.01)
*A63F 13/73* (2014.01)
*G07F 17/32* (2006.01)

(52) U.S. Cl.
CPC .............. *A63F 13/87* (2014.09); *A63F 13/73* (2014.09); *G07F 17/3237* (2013.01)

(58) Field of Classification Search
CPC . H04L 63/102; G01S 5/0252; G07F 17/3269; G07F 17/32; A63F 9/24
See application file for complete search history.

(56) References Cited

U.S. PATENT DOCUMENTS

| 3,580,581 A | 5/1971 | Raven |
| 3,838,259 A | 9/1974 | Kortenhaus |
| 3,876,208 A | 4/1975 | Wachtler et al. |

(Continued)

FOREIGN PATENT DOCUMENTS

| AU | 2004100722 | 10/2004 |
| CN | 1346549 | 4/2002 |

(Continued)

OTHER PUBLICATIONS

Solutions for Restaurants, Hotels & Resorts and Clubs—Guestbridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.

(Continued)

*Primary Examiner* — Reginald A Renwick

(57) ABSTRACT

Various embodiments that may generally relate to mobile gaming, location determination, mobile devices, authentication, and so on are described. Various methods are described. Various apparatus are described. Further embodiments are described.

18 Claims, 8 Drawing Sheets

(56) References Cited

U.S. PATENT DOCUMENTS

| | | |
|---|---|---|
| 3,929,338 A | 12/1975 | Busch |
| 4,101,129 A | 7/1978 | Cox |
| 4,120,294 A | 10/1978 | Wolfe |
| 4,157,829 A | 6/1979 | Goldman et al. |
| 4,206,920 A | 6/1980 | Weatherford et al. |
| 4,216,965 A | 8/1980 | Morrison et al. |
| 4,238,127 A | 12/1980 | Lucero et al. |
| 4,240,635 A | 12/1980 | Brown |
| 4,266,214 A | 5/1981 | Peters, Jr. |
| 4,335,809 A | 6/1982 | Wain |
| 4,448,419 A | 5/1984 | Telnaes |
| 4,467,424 A | 8/1984 | Hedges et al. |
| 4,492,379 A | 1/1985 | Okada |
| 4,527,798 A | 7/1985 | Siekierski et al. |
| 4,572,509 A | 2/1986 | Stirick |
| 4,573,681 A | 3/1986 | Okada |
| 4,614,342 A | 9/1986 | Takashima |
| 4,624,459 A | 11/1986 | Kaufman |
| 4,636,951 A | 1/1987 | Harlick |
| 4,648,600 A | 3/1987 | Oliiges |
| 4,652,998 A | 3/1987 | Koza et al. |
| 4,692,863 A | 9/1987 | Moosz |
| 4,760,527 A | 7/1988 | Sidley |
| 4,805,907 A | 2/1989 | Hagiwara |
| 4,810,868 A | 3/1989 | Drexler |
| 4,817,951 A | 4/1989 | Crouch et al. |
| 4,838,552 A | 6/1989 | Hagiwara |
| 4,853,884 A | 8/1989 | Brown et al. |
| 4,856,787 A | 8/1989 | Itkis |
| 4,858,932 A | 8/1989 | Keane |
| 4,880,237 A | 11/1989 | Kishishita |
| 4,882,473 A | 11/1989 | Bergeron et al. |
| 4,909,516 A | 3/1990 | Kolinsky |
| 4,926,327 A | 5/1990 | Sidley |
| 4,959,783 A | 9/1990 | Scott et al. |
| 4,964,638 A | 10/1990 | Ishida |
| 5,001,632 A | 3/1991 | Hall-Tipping |
| 5,007,087 A | 4/1991 | Bernstein et al. |
| 5,024,441 A | 6/1991 | Rosseau |
| 5,048,833 A | 9/1991 | Lamle |
| 5,050,881 A | 9/1991 | Nagao |
| 5,055,662 A | 10/1991 | Hasegawa |
| 5,056,141 A | 10/1991 | Dyke |
| 5,074,559 A | 12/1991 | Okada |
| 5,083,785 A | 1/1992 | Okada |
| 5,096,195 A | 3/1992 | Gimmon |
| 5,096,202 A | 3/1992 | Hesland |
| 5,102,134 A | 4/1992 | Smyth |
| 5,151,684 A | 9/1992 | Johnsen |
| 5,192,076 A | 3/1993 | Komori |
| 5,229,764 A | 7/1993 | Matchett |
| 5,242,163 A | 9/1993 | Fulton |
| 5,251,165 A | 10/1993 | James, III |
| 5,251,898 A | 10/1993 | Dickenson et al. |
| 5,263,716 A | 11/1993 | Smyth |
| 5,265,874 A | 11/1993 | Dickinson et al. |
| 5,280,426 A | 1/1994 | Edmonds |
| 5,280,909 A | 1/1994 | Tracy |
| 5,298,476 A | 3/1994 | Hotta et al. |
| 5,324,035 A | 6/1994 | Morris et al. |
| 5,326,104 A | 7/1994 | Pease et al. |
| 5,344,199 A | 9/1994 | Carstens et al. |
| 5,351,970 A | 10/1994 | Fioretti |
| 5,359,183 A | 10/1994 | Skodlar |
| 5,370,306 A | 12/1994 | Schulze et al. |
| 5,380,007 A | 1/1995 | Travis et al. |
| 5,380,008 A | 1/1995 | Mathis et al. |
| 5,393,061 A | 2/1995 | Manship et al. |
| 5,398,932 A | 3/1995 | Eberhardt et al. |
| 5,415,416 A | 5/1995 | Scagnelli et al. |
| 5,421,576 A | 6/1995 | Yamazaki et al. |
| 5,429,361 A | 7/1995 | Raven et al. |
| 5,471,044 A | 11/1995 | Hotta et al. |
| 5,476,259 A | 12/1995 | Weingardt |
| 5,505,449 A | 4/1996 | Eberhardt et al. |
| 5,507,485 A | 4/1996 | Fisher |
| 5,511,784 A | 4/1996 | Furry et al. |
| 5,524,888 A | 6/1996 | Heidel |
| 5,534,685 A | 7/1996 | Takemoto et al. |
| 5,551,692 A | 9/1996 | Pettit et al. |
| 5,569,083 A | 10/1996 | Fioretti |
| 5,569,084 A | 10/1996 | Nicastro et al. |
| 5,580,309 A | 12/1996 | Piechowiak et al. |
| 5,586,937 A | 12/1996 | Menashe |
| 5,588,913 A | 12/1996 | Hecht |
| 5,599,231 A | 2/1997 | Hibino et al. |
| 5,613,912 A | 3/1997 | Slater |
| 5,618,045 A | 4/1997 | Kagan et al. |
| 5,618,232 A | 4/1997 | Martin |
| 5,645,277 A | 7/1997 | Cheng |
| 5,653,634 A | 8/1997 | Hodges |
| 5,654,746 A | 8/1997 | McMulan, Jr. et al. |
| 5,655,961 A | 8/1997 | Acres et al. |
| 5,675,828 A | 10/1997 | Stoel et al. |
| 5,697,844 A | 12/1997 | Von Kohorn |
| 5,702,302 A | 12/1997 | Gauselman |
| 5,707,286 A | 1/1998 | Carlson |
| 5,738,583 A | 4/1998 | Comas et al. |
| 5,745,102 A | 4/1998 | Bloch et al. |
| 5,762,552 A | 6/1998 | Vuong et al. |
| 5,764,789 A | 6/1998 | Pare, Jr. et al. |
| 5,766,076 A | 6/1998 | Pease et al. |
| 5,768,382 A | 6/1998 | Schneier et al. |
| 5,772,508 A | 6/1998 | Sugita et al. |
| 5,779,549 A | 7/1998 | Walker |
| 5,785,595 A | 7/1998 | Gauselman |
| 5,787,156 A | 7/1998 | Katz |
| 5,806,849 A | 9/1998 | Rutkowski |
| 5,816,918 A | 10/1998 | Kelly et al. |
| 5,816,920 A | 10/1998 | Hanai |
| 5,851,148 A | 10/1998 | Brune et al. |
| 5,833,536 A | 11/1998 | Davids et al. |
| 5,835,722 A | 11/1998 | Bradshaw et al. |
| 5,836,817 A | 11/1998 | Acres et al. |
| 5,857,911 A | 1/1999 | Fioretti |
| 5,871,398 A | 2/1999 | Schneier et al. |
| 5,878,211 A | 3/1999 | Delagrange |
| 5,881,366 A | 3/1999 | Bodernmann et al. |
| 5,889,474 A | 3/1999 | LaDue |
| 5,902,983 A | 5/1999 | Crevelt et al. |
| 5,904,619 A | 5/1999 | Scagnelli et al. |
| 5,904,620 A | 5/1999 | Kujawa |
| 5,907,282 A | 5/1999 | Tuorto et al. |
| 5,910,047 A | 6/1999 | Scagnelli et al. |
| 5,920,640 A | 7/1999 | Salatino et al. |
| 5,921,865 A | 7/1999 | Scagnelli |
| 5,931,764 A | 8/1999 | Freeman et al. |
| 5,935,005 A | 8/1999 | Tsuda et al. |
| 5,951,397 A | 9/1999 | Dickinson |
| 5,954,583 A | 9/1999 | Green |
| 5,955,961 A | 9/1999 | Wallerstein |
| 5,959,596 A | 9/1999 | McCarten et al. |
| 5,970,143 A | 10/1999 | Schneier et al. |
| 5,977,957 A | 11/1999 | Miller et al. |
| 5,987,611 A | 11/1999 | Freund |
| 5,991,431 A | 11/1999 | Borza et al. |
| 5,995,630 A | 11/1999 | Borza et al. |
| 5,999,808 A | 12/1999 | LaDue |
| 6,001,015 A | 12/1999 | Nishiumi et al. |
| 6,001,016 A | 12/1999 | Walker et al. |
| 6,003,013 A | 12/1999 | Boushy et al. |
| 6,011,973 A | 1/2000 | Valentine et al. |
| 6,012,636 A | 1/2000 | Smith |
| 6,012,982 A | 1/2000 | Piechowiak et al. |
| 6,019,284 A | 2/2000 | Freeman et al. |
| 6,022,274 A | 2/2000 | Takeda et al. |
| 6,022,294 A | 2/2000 | Takeda et al. |
| 6,027,115 A | 2/2000 | Griswold et al. |
| 6,044,062 A | 3/2000 | Brownrigg et al. |
| 6,048,269 A | 4/2000 | Burns et al. |
| 6,050,622 A | 4/2000 | Gustafson |
| 6,065,056 A | 5/2000 | Bradshaw et al. |
| 6,080,061 A | 6/2000 | Watanabe et al. |
| 6,098,985 A | 8/2000 | Moody |

(56) References Cited

U.S. PATENT DOCUMENTS

| | | |
|---|---|---|
| 6,099,408 A | 8/2000 | Schneier et al. |
| 6,100,804 A | 8/2000 | Brady et al. |
| 6,104,295 A | 8/2000 | Gaisser et al. |
| 6,104,815 A | 8/2000 | Alcorn |
| 6,117,011 A | 9/2000 | Lvov |
| 6,135,884 A | 10/2000 | Hedrick et al. |
| 6,139,431 A | 10/2000 | Walker et al. |
| 6,146,270 A | 11/2000 | Huard et al. |
| 6,148,094 A | 11/2000 | Kinsella |
| 6,177,905 B1 | 1/2001 | Welch |
| 6,178,255 B1 | 1/2001 | Scott et al. |
| 6,178,510 B1 | 1/2001 | O'Connor et al. |
| 6,183,366 B1 | 2/2001 | Goldberg et al. |
| 6,193,153 B1 | 2/2001 | Lambert |
| 6,196,920 B1 | 3/2001 | Spaur et al. |
| 6,210,274 B1 | 4/2001 | Carlson |
| 6,212,392 B1 | 4/2001 | Fitch et al. |
| 6,219,439 B1 | 4/2001 | Burger |
| 6,233,448 B1 | 5/2001 | Alperovich et al. |
| 6,248,017 B1 | 6/2001 | Roach |
| 6,251,014 B1 | 6/2001 | Stockdale et al. |
| 6,251,017 B1 | 6/2001 | Leason et al. |
| 6,264,560 B1 | 7/2001 | Goldberg et al. |
| 6,265,973 B1 | 7/2001 | Brammall et al. |
| 6,272,223 B1 | 8/2001 | Carlson |
| 6,277,026 B1 | 8/2001 | Archer |
| 6,277,029 B1 | 8/2001 | Hanley |
| 6,280,325 B1 | 8/2001 | Fisk |
| 6,287,202 B1 | 9/2001 | Pascal et al. |
| 6,290,601 B1 | 9/2001 | Yamazaki et al. |
| RE37,414 E | 10/2001 | Harlick |
| 6,309,307 B1 | 10/2001 | Krause et al. |
| 6,320,495 B1 | 11/2001 | Sporgis |
| 6,325,285 B1 | 12/2001 | Baratelli |
| 6,325,292 B1 | 12/2001 | Sehr |
| 6,331,148 B1 | 12/2001 | Krause et al. |
| 6,359,661 B1 | 3/2002 | Nickum |
| 6,386,976 B1 | 5/2002 | Yamazaki et al. |
| 6,388,612 B1 | 5/2002 | Neher |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson |
| 6,441,752 B1 | 8/2002 | Fomukong |
| 6,454,648 B1 | 9/2002 | Kelly |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia et al. |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,705 B1 | 4/2003 | Cumbers |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,604,980 B1 | 8/2003 | Jurmain |
| 6,612,928 B1 | 9/2003 | Bradford et al. |
| 6,614,350 B1 | 9/2003 | Lunsford |
| 6,618,706 B1 | 9/2003 | Rive et al. |
| 6,622,157 B1 | 9/2003 | Heddaya et al. |
| 6,628,939 B2 | 9/2003 | Paulsen |
| 6,631,849 B2 | 10/2003 | Blossom |
| 6,634,942 B2 | 10/2003 | Walker |
| 6,645,077 B2 | 11/2003 | Rowe |
| 6,652,378 B2 | 11/2003 | Cannon et al. |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,709,333 B1 | 3/2004 | Bradford et al. |
| 6,719,631 B1 | 4/2004 | Tulley et al. |
| 6,721,542 B1 | 4/2004 | Anttila et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 | 7/2004 | Narita |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,806,889 B1 | 10/2004 | Malaure |
| 6,811,488 B2 | 11/2004 | Paravia et al. |
| 6,812,824 B1 | 11/2004 | Goldinger et al. |
| 6,834,195 B2 | 12/2004 | Brandenberg et al. |
| 6,837,789 B2 | 1/2005 | Garahi et al. |
| 6,839,560 B1 | 1/2005 | Bahl et al. |
| 6,843,412 B1 | 1/2005 | Sanford |
| 6,843,725 B2 | 1/2005 | Nelson |
| 6,846,238 B2 | 1/2005 | Wells et al. |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,893,347 B1 | 5/2005 | Zilliacus |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,945,870 B2 | 9/2005 | Gatto et al. |
| RE38,812 E | 10/2005 | Acres et al. |
| 6,942,574 B1 | 10/2005 | Lemay et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Nguyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,027,820 B2 | 4/2006 | Spratt |
| 7,029,394 B2 | 4/2006 | Leen et al. |
| 7,033,276 B2 | 4/2006 | Walker et al. |
| 7,034,683 B2 | 4/2006 | Ghazarian |
| 7,035,653 B2 | 4/2006 | Simon et al. |
| 7,040,987 B2 | 5/2006 | Walker et al. |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 | 5/2006 | Bennett |
| 7,056,217 B1 | 6/2006 | Pelkey et al. |
| 7,097,562 B2 | 8/2006 | Gagner |
| 7,081,815 B2 | 9/2006 | Runyon et al. |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,128,482 B2 | 10/2006 | Meyerhofer et al. |
| 7,144,011 B2 | 12/2006 | Asher et al. |
| 7,147,558 B2 | 12/2006 | Giobbi |
| 7,158,798 B2 | 1/2007 | Lee et al. |

(56) References Cited

U.S. PATENT DOCUMENTS

| | | |
|---|---|---|
| 7,164,354 B1 | 1/2007 | Panzer |
| 7,168,626 B2 | 1/2007 | Lerch et al. |
| 7,185,360 B1 | 2/2007 | Anton et al. |
| 7,194,273 B2 | 3/2007 | Vaudreuil |
| 7,207,885 B2 | 4/2007 | Longman |
| 7,228,651 B1 | 6/2007 | Saari |
| 7,229,354 B2 | 6/2007 | McNutt et al. |
| 7,229,385 B2 | 6/2007 | Freeman et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,284,708 B2 | 10/2007 | Martin |
| 7,288,025 B1 | 10/2007 | Cumbers |
| 7,288,028 B2 | 10/2007 | Rodriquez et al. |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,311,608 B1 | 12/2007 | Danieli |
| 7,316,619 B2 | 1/2008 | Nelson |
| 7,341,517 B2 | 3/2008 | Asher et al. |
| 7,357,717 B1 | 4/2008 | Cumbers |
| 7,367,049 B1 | 4/2008 | Robinson |
| 7,394,405 B2 | 7/2008 | Godden |
| 7,413,513 B2 | 8/2008 | Nguyen et al. |
| 7,429,215 B2 | 9/2008 | Rozkin |
| 7,431,650 B2 | 10/2008 | Kessman |
| 7,435,179 B1 | 10/2008 | Ford |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,458,894 B2 | 12/2008 | Danieli |
| 7,460,863 B2 | 12/2008 | Steelberg et al. |
| 7,470,191 B2 | 12/2008 | Xidos |
| 7,479,065 B1 | 1/2009 | McAllister et al. |
| 7,493,211 B2 | 2/2009 | Breen |
| 7,506,172 B2 | 3/2009 | Bhakta |
| 7,510,474 B2 | 3/2009 | Carter |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 7,577,847 B2 | 8/2009 | Nguyen |
| 7,637,810 B2 | 12/2009 | Amaitis et al. |
| 7,665,668 B2 | 2/2010 | Phillips |
| 7,686,687 B2 | 3/2010 | Cannon et al. |
| 7,689,459 B2 | 3/2010 | Capurso et al. |
| 7,736,221 B2 | 6/2010 | Black et al. |
| 7,742,972 B2 | 6/2010 | Lange et al. |
| 7,744,002 B2 | 6/2010 | Jones et al. |
| 7,802,724 B1 | 9/2010 | Nohr |
| 7,819,749 B1 | 10/2010 | Fish et al. |
| 7,828,652 B2 | 11/2010 | Nguyen et al. |
| 7,828,654 B2 | 11/2010 | Carter, Sr. |
| 7,828,661 B1 | 11/2010 | Fish et al. |
| 7,867,083 B2 | 1/2011 | Wells et al. |
| 7,937,336 B1 | 5/2011 | Maynard-Zhang et al. |
| 7,946,917 B2 | 5/2011 | Kaminkow et al. |
| 7,967,682 B2 | 6/2011 | Huizinga |
| 8,016,667 B2 | 9/2011 | Benbrahim et al. |
| 8,047,914 B2 | 11/2011 | Morrow |
| 8,123,616 B2 | 2/2012 | Wells et al. |
| 8,142,283 B2 | 3/2012 | Lutnick |
| 8,162,756 B2 | 4/2012 | Amaitis et al. |
| 8,221,225 B2 | 7/2012 | Laut |
| 8,267,789 B2 | 9/2012 | Nelson |
| 8,282,490 B2 * | 10/2012 | Arezina .............. G07F 17/3216 463/42 |
| 8,285,484 B1 | 10/2012 | Lau |
| 8,287,380 B2 | 10/2012 | Nguyen |
| 8,292,741 B2 | 10/2012 | Burman et al. |
| 8,298,078 B2 | 10/2012 | Sutton et al. |
| 8,306,830 B1 | 11/2012 | Renuart |
| 8,308,568 B2 | 11/2012 | Amaitis et al. |
| 8,393,948 B2 | 3/2013 | Allen |
| 8,425,314 B2 | 4/2013 | Benbrahim |
| 8,504,617 B2 | 8/2013 | Amaitis et al. |
| 8,506,400 B2 | 8/2013 | Amaitis et al. |
| 8,510,567 B2 | 8/2013 | Alderucci et al. |
| 8,536,999 B2 | 9/2013 | Holcman |
| 8,613,658 B2 | 12/2013 | Amaitis et al. |
| 8,616,967 B2 | 12/2013 | Amaitis et al. |
| 8,645,709 B2 | 2/2014 | Alderucci et al. |
| 8,708,805 B2 | 4/2014 | Amaitis et al. |
| 8,764,566 B2 | 7/2014 | Miltenberger |
| 8,784,197 B2 | 7/2014 | Alderucci et al. |
| 8,858,323 B2 | 10/2014 | Nguyen et al. |
| 8,956,231 B2 | 2/2015 | Amaitis et al. |
| 8,968,077 B2 | 3/2015 | Weber et al. |
| 8,974,302 B2 | 3/2015 | Amaitis et al. |
| 8,977,296 B1 | 3/2015 | Briggs et al. |
| 8,997,296 B2 | 3/2015 | Briggs et al. |
| 9,280,648 B2 | 3/2016 | Alderucci |
| 9,306,952 B2 | 4/2016 | Burman et al. |
| 9,355,518 B2 | 5/2016 | Amaitis et al. |
| 9,363,251 B2 | 6/2016 | Morikuni |
| 9,411,944 B2 | 8/2016 | Alderucci et al. |
| 9,430,901 B2 | 8/2016 | Amaitis et al. |
| 9,430,909 B2 | 8/2016 | Shore |
| 9,489,793 B2 | 11/2016 | Williams et al. |
| 10,535,221 B2 | 1/2020 | Burman et al. |
| 2001/0018663 A1 | 8/2001 | Dusell et al. |
| 2001/0026240 A1 | 10/2001 | Neher |
| 2001/0026610 A1 | 10/2001 | Katz et al. |
| 2001/0026632 A1 | 10/2001 | Tamai |
| 2001/0027130 A1 | 10/2001 | Namba et al. |
| 2001/0028308 A1 | 10/2001 | De La Huerga |
| 2001/0031663 A1 | 10/2001 | Johnson |
| 2001/0034237 A1 | 10/2001 | Garahi |
| 2001/0034268 A1 | 10/2001 | Thomas et al. |
| 2001/0036858 A1 | 11/2001 | McNutt et al. |
| 2001/0049275 A1 | 12/2001 | Pierry et al. |
| 2001/0055991 A1 | 12/2001 | Hightower |
| 2002/0002075 A1 | 1/2002 | Rowe |
| 2002/0013153 A1 | 1/2002 | Wilcock |
| 2002/0013827 A1 | 1/2002 | Edstrom et al. |
| 2002/0028674 A1 | 3/2002 | Slettengren |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0086732 A1 | 7/2002 | Kirmse et al. |
| 2002/0087505 A1 | 7/2002 | Smith |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0123377 A1 | 9/2002 | Shulman |
| 2002/0124182 A1 | 9/2002 | Basco |
| 2002/0125886 A1 | 9/2002 | Bates et al. |
| 2002/0128057 A1 | 9/2002 | Walker et al. |
| 2002/0132663 A1 | 9/2002 | Cumbers |
| 2002/0138461 A1 | 9/2002 | Sinclair |
| 2002/0142839 A1 | 10/2002 | Wolinsky |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter, Sr. |
| 2002/0147762 A1 | 10/2002 | Tree |
| 2002/0151344 A1 | 10/2002 | Tanskanen |
| 2002/0155884 A1 | 10/2002 | Updike |
| 2002/0157090 A1 | 10/2002 | Anton, Jr. |
| 2002/0160834 A1 | 10/2002 | Urie et al. |

(56) References Cited

U.S. PATENT DOCUMENTS

| | | |
|---|---|---|
| 2002/0160838 A1 | 10/2002 | Kim |
| 2002/0165020 A1 | 11/2002 | Koyama |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair |
| 2002/0198044 A1 | 12/2002 | Walker |
| 2002/0198051 A1 | 12/2002 | Lobel et al. |
| 2003/0001882 A1 | 1/2003 | Macer |
| 2003/0003988 A1 | 1/2003 | Walker et al. |
| 2003/0003997 A1 | 1/2003 | Vuong et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0013513 A1 | 1/2003 | Rowe |
| 2003/0014639 A1 | 1/2003 | Jackson |
| 2003/0017871 A1 | 1/2003 | Urie et al. |
| 2003/0027631 A1 | 2/2003 | Hedrick et al. |
| 2003/0027634 A1 | 2/2003 | Matthews, III |
| 2003/0028567 A1 | 2/2003 | Carlson |
| 2003/0031321 A1 | 2/2003 | Mages |
| 2003/0032407 A1 | 2/2003 | Mages |
| 2003/0032434 A1 | 2/2003 | Willner et al. |
| 2003/0032474 A1 | 2/2003 | Kaminkow |
| 2003/0036425 A1 | 2/2003 | Kaminkow et al. |
| 2003/0036428 A1 | 2/2003 | Aasland |
| 2003/0038805 A1 | 2/2003 | Wong et al. |
| 2003/0040324 A1 | 2/2003 | Eldering et al. |
| 2003/0045269 A1 | 3/2003 | Himmel |
| 2003/0045353 A1 | 3/2003 | Paulsen et al. |
| 2003/0045354 A1 | 3/2003 | Globbi |
| 2003/0045358 A1 | 3/2003 | Leen et al. |
| 2003/0050115 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 | 4/2003 | Grauzer et al. |
| 2003/0064805 A1 | 4/2003 | Wells |
| 2003/0064807 A1 | 4/2003 | Walker et al. |
| 2003/0065805 A1 | 4/2003 | Barnes, Jr. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087652 A1 | 5/2003 | Simon et al. |
| 2003/0087701 A1 | 5/2003 | Paravia et al. |
| 2003/0104851 A1 | 6/2003 | Merari |
| 2003/0104860 A1 | 6/2003 | Cannon |
| 2003/0104865 A1 | 6/2003 | Itkis et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0125973 A1 | 7/2003 | Mathews |
| 2003/0130032 A1 | 7/2003 | Martinek et al. |
| 2003/0130039 A1 | 7/2003 | Nelson |
| 2003/0139190 A1 | 7/2003 | Steelberg |
| 2003/0140131 A1 | 7/2003 | Chandrashekhar |
| 2003/0144047 A1 | 7/2003 | Sprogis |
| 2003/0148809 A1 | 8/2003 | Nelson |
| 2003/0148812 A1 | 8/2003 | Paulsen et al. |
| 2003/0157976 A1 | 8/2003 | Simon |
| 2003/0162580 A1 | 8/2003 | Cousineau |
| 2003/0162593 A1 | 8/2003 | Griswold et al. |
| 2003/0162594 A1 | 8/2003 | Rowe |
| 2003/0165293 A1 | 9/2003 | Abeles et al. |
| 2003/0173408 A1 | 9/2003 | Mosher et al. |
| 2003/0176162 A1 | 9/2003 | Planki |
| 2003/0176218 A1 | 9/2003 | Lemay |
| 2003/0177187 A1 | 9/2003 | Levine et al. |
| 2003/0177347 A1 | 9/2003 | Schneier et al. |
| 2003/0190944 A1 | 10/2003 | Manfredi et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |
| 2003/0199313 A1 | 10/2003 | Gonen |
| 2003/0208684 A1 | 11/2003 | Camacho et al. |
| 2003/0212996 A1 | 11/2003 | Wolzien |
| 2003/0224855 A1 | 12/2003 | Cunningham |
| 2003/0228895 A1 | 12/2003 | Edelson |
| 2003/0228898 A1 | 12/2003 | Rowe |
| 2003/0228901 A1 | 12/2003 | Walker et al. |
| 2003/0228907 A1 | 12/2003 | Gatto et al. |
| 2003/0228910 A1 | 12/2003 | Jawaharla et al. |
| 2003/0233650 A1 | 12/2003 | Zaner |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0005919 A1 | 1/2004 | Walker |
| 2004/0009812 A1 | 1/2004 | Scott et al. |
| 2004/0014522 A1 | 1/2004 | Walker et al. |
| 2004/0029635 A1 | 2/2004 | Giobbi |
| 2004/0029638 A1 | 2/2004 | Hytchenson |
| 2004/0034775 A1 | 2/2004 | Desjardins et al. |
| 2004/0038734 A1 | 2/2004 | Adams |
| 2004/0043763 A1 | 3/2004 | Minear |
| 2004/0044774 A1 | 3/2004 | Mangalik et al. |
| 2004/0048613 A1 | 3/2004 | Sayers |
| 2004/0053692 A1 | 3/2004 | Chatingny et al. |
| 2004/0061646 A1 | 4/2004 | Andrews et al. |
| 2004/0063497 A1 | 4/2004 | Gould |
| 2004/0067760 A1 | 4/2004 | Menjo et al. |
| 2004/0068441 A1 | 4/2004 | Werbitt |
| 2004/0068532 A1 | 4/2004 | Dewing |
| 2004/0082383 A1 | 4/2004 | Muncaster |
| 2004/0083394 A1 | 4/2004 | Brebner et al. |
| 2004/0669296 | 4/2004 | Atherton |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Kotik et al. |
| 2004/0104845 A1 | 6/2004 | McCarthy |
| 2004/0110565 A1 | 6/2004 | Levesque |
| 2004/0111369 A1 | 6/2004 | Lane et al. |
| 2004/0111515 A1 | 6/2004 | Manion |
| 2004/0118930 A1 | 6/2004 | Berardi et al. |
| 2004/0127277 A1 | 7/2004 | Pierce |
| 2004/0127289 A1 | 7/2004 | Davis |
| 2004/0129787 A1 | 7/2004 | Saito |
| 2004/0132530 A1 | 7/2004 | Rutanen |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0152511 A1 | 8/2004 | Nicely |
| 2004/0162124 A1 | 8/2004 | Barton |
| 2004/0162144 A1 | 8/2004 | Loose |
| 2004/0185881 A1 | 9/2004 | Lee et al. |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198398 A1 | 10/2004 | Amir et al. |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2004/0242297 A1 | 12/2004 | Walker |
| 2004/0242322 A1 | 12/2004 | Montagna |
| 2004/0242332 A1 | 12/2004 | Walker et al. |
| 2004/0242639 A1 | 12/2004 | Lagu et al. |
| 2004/0243504 A1 | 12/2004 | Asher et al. |
| 2004/0243941 A1 | 12/2004 | Fish |

(56) References Cited

U.S. PATENT DOCUMENTS

| | | |
|---|---|---|
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0259642 A1 | 12/2004 | Tanaka |
| 2004/0260647 A1 | 12/2004 | Blinn |
| 2004/0266533 A1 | 12/2004 | Gentles et al. |
| 2005/0001711 A1 | 1/2005 | Doughty et al. |
| 2005/0003881 A1 | 1/2005 | Byng |
| 2005/0003888 A1 | 1/2005 | Asher et al. |
| 2005/0003893 A1 | 1/2005 | Hogwood et al. |
| 2005/0009600 A1 | 1/2005 | Rowe et al. |
| 2005/0014554 A1 | 1/2005 | Walker et al. |
| 2005/0020336 A1 | 1/2005 | Cesare |
| 2005/0020340 A1 | 1/2005 | Cannon |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049022 A1 | 3/2005 | Mullen |
| 2005/0049731 A1 | 3/2005 | Dell |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0070359 A1 | 3/2005 | Rodriquez et al. |
| 2005/0071481 A1 | 3/2005 | Danieli |
| 2005/0073443 A1 | 4/2005 | Sheha |
| 2005/0086301 A1 | 4/2005 | Eichler et al. |
| 2005/0090294 A1 | 4/2005 | Narasimhan |
| 2005/0091529 A1 | 4/2005 | Manion |
| 2005/0096109 A1 | 5/2005 | McNutt et al. |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0107156 A1 | 5/2005 | Potts et al. |
| 2005/0108365 A1 | 5/2005 | Becker et al. |
| 2005/0113172 A1 | 5/2005 | Gong |
| 2005/0116020 A1 | 6/2005 | Smolucha et al. |
| 2005/0130677 A1 | 6/2005 | Meunier et al. |
| 2005/0130728 A1 | 6/2005 | Ngyuen |
| 2005/0131815 A1 | 6/2005 | Fung et al. |
| 2005/0137014 A1 | 6/2005 | Vetelainen |
| 2005/0143169 A1 | 6/2005 | Ngyuen et al. |
| 2005/0144484 A1 | 6/2005 | Wakayama |
| 2005/0159212 A1 | 7/2005 | Romney et al. |
| 2005/0170845 A1 | 8/2005 | Moran |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Miller |
| 2005/0187020 A1 | 8/2005 | Amaitis et al. |
| 2005/0190901 A1 | 9/2005 | Oborn et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0022767 A1 | 10/2005 | De Vries |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0243774 A1 | 10/2005 | Dupree |
| 2005/0245306 A1 | 11/2005 | Asher et al. |
| 2005/0245308 A1 | 11/2005 | Amaitis et al. |
| 2005/0251440 A1 | 11/2005 | Bednarek |
| 2005/0261061 A1 | 11/2005 | Nguyen et al. |
| 2005/0273845 A1 | 12/2005 | Urano |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0020558 A1 | 1/2006 | Bonalle |
| 2006/0121987 A1 | 1/2006 | Bortnik et al. |
| 2006/0121992 A1 | 1/2006 | Bortnik et al. |
| 2006/0035707 A1 | 2/2006 | Nguyen et al. |
| 2006/0040717 A1 | 2/2006 | Lind et al. |
| 2006/0040741 A1 | 2/2006 | Grisworld et al. |
| 2006/0052153 A1 | 3/2006 | Vlazny et al. |
| 2006/0058102 A1 | 3/2006 | Nguyen et al. |
| 2006/0058103 A1 | 3/2006 | Danieli |
| 2006/0068917 A1 | 3/2006 | Snoddy et al. |
| 2006/0069711 A1 | 3/2006 | Tsunekawa et al. |
| 2006/0076406 A1 | 4/2006 | Ulrich et al. |
| 2006/0079244 A1 | 4/2006 | Posner |
| 2006/0093142 A1 | 5/2006 | Schneier et al. |
| 2006/0095790 A1 | 5/2006 | Nguyen et al. |
| 2006/0100019 A1 | 5/2006 | Hornik et al. |
| 2006/0105838 A1 | 5/2006 | Mullen |
| 2006/0106736 A1 | 5/2006 | Jung |
| 2006/0112279 A1 | 5/2006 | Cohen |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0128397 A1 | 6/2006 | Choti et al. |
| 2006/0129432 A1 | 6/2006 | Choti et al. |
| 2006/0131391 A1 | 6/2006 | Penuela |
| 2006/0135252 A1 | 6/2006 | Amaitis et al. |
| 2006/0135259 A1 | 6/2006 | Nancke-Krogh et al. |
| 2006/0136296 A1 | 6/2006 | Amada |
| 2006/0136584 A1 | 6/2006 | Decker |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0161750 A1 | 7/2006 | Perkins |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0173754 A1 | 8/2006 | Burton et al. |
| 2006/0178216 A1 | 8/2006 | Shea et al. |
| 2006/0183522 A1 | 8/2006 | Leen et al. |
| 2006/0184417 A1 | 8/2006 | Van der Linden et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0199649 A1 | 9/2006 | Soltys et al. |
| 2006/0205489 A1 | 9/2006 | Carpenter et al. |
| 2006/0205497 A1 | 9/2006 | Wells et al. |
| 2006/0209810 A1 | 9/2006 | Krzyzanowski et al. |
| 2006/0224046 A1 | 10/2006 | Ramadas et al. |
| 2006/0229520 A1 | 10/2006 | Yamashita |
| 2006/0234631 A1 | 10/2006 | Dieguez |
| 2006/0234791 A1 | 10/2006 | Nguyen et al. |
| 2006/0236395 A1 | 10/2006 | Barker et al. |
| 2006/0240856 A1 | 10/2006 | Counts |
| 2006/0242234 A1 | 10/2006 | Counts |
| 2006/0242237 A1 | 10/2006 | Manion |
| 2006/0025501 A1 | 11/2006 | Little et al. |
| 2006/0246990 A1 | 11/2006 | Downes |
| 2006/0247026 A1 | 11/2006 | Walker et al. |
| 2006/0247039 A1 | 11/2006 | Lerner et al. |
| 2006/0247041 A1 | 11/2006 | Walker et al. |
| 2006/0247053 A1 | 11/2006 | Mattila |
| 2006/0248584 A1 | 11/2006 | Kelly |
| 2006/0252530 A1 | 11/2006 | Oberberger et al. |
| 2006/0258429 A1 | 11/2006 | Manning et al. |
| 2006/0277098 A1 | 12/2006 | Chung et al. |
| 2006/0277308 A1 | 12/2006 | Morse et al. |
| 2006/0277413 A1 | 12/2006 | Drews |
| 2006/0281541 A1 | 12/2006 | Nguyen et al. |
| 2006/0287092 A1 | 12/2006 | Walker et al. |
| 2006/0287098 A1 | 12/2006 | Morrow et al. |

(56) References Cited

U.S. PATENT DOCUMENTS

| | | |
|---|---|---|
| 2006/0293965 A1 | 12/2006 | Burton |
| 2007/0001841 A1 | 1/2007 | Anders et al. |
| 2007/0003034 A1 | 1/2007 | Schultz et al. |
| 2007/0008987 A1 | 1/2007 | Manion |
| 2007/0015564 A1 | 1/2007 | Walker et al. |
| 2007/0021213 A1 | 1/2007 | Foe et al. |
| 2007/0026871 A1 | 2/2007 | Wager |
| 2007/0026939 A1 | 2/2007 | Asher et al. |
| 2007/0030154 A1 | 2/2007 | Aiki et al. |
| 2007/0032301 A1 | 2/2007 | Acres et al. |
| 2007/0054739 A1 | 3/2007 | Amaitis et al. |
| 2007/0055440 A1 | 3/2007 | Denker |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0066401 A1 | 3/2007 | Amaitis |
| 2007/0066402 A1 | 3/2007 | Amaitis |
| 2007/0087834 A1 | 4/2007 | Moser et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0130044 A1 | 6/2007 | Rowan |
| 2007/0136817 A1 | 6/2007 | Ngyuen |
| 2007/0155489 A1 | 7/2007 | Beckley |
| 2007/0167237 A1 | 7/2007 | Wang et al. |
| 2007/0168570 A1 | 7/2007 | Martin et al. |
| 2007/0181676 A1 | 8/2007 | Mateen et al. |
| 2007/0190494 A1 | 8/2007 | Rosenberg |
| 2007/0191719 A1 | 8/2007 | Yamashita et al. |
| 2007/0213120 A1 | 9/2007 | Beal et al. |
| 2007/0233585 A1 | 10/2007 | Ben Simon et al. |
| 2007/0235807 A1 | 10/2007 | Sobel et al. |
| 2007/0238443 A1 | 10/2007 | Richardson |
| 2007/0241187 A1 | 10/2007 | Alderucci et al. |
| 2007/0243927 A1 | 10/2007 | Soltys |
| 2007/0243935 A1 | 10/2007 | Huizinga |
| 2007/0257101 A1 | 11/2007 | Alderucci et al. |
| 2007/0258507 A1 | 11/2007 | Lee et al. |
| 2007/0259717 A1 | 11/2007 | Mattice et al. |
| 2007/0275779 A1 | 11/2007 | Amaitis |
| 2007/0281689 A1 | 12/2007 | Altman |
| 2007/0281782 A1 | 12/2007 | Amaitis |
| 2007/0281785 A1 | 12/2007 | Amaitis |
| 2007/0281792 A1 | 12/2007 | Amaitis |
| 2007/0282959 A1 | 12/2007 | Stern |
| 2008/0004121 A1 | 1/2008 | Gatto et al. |
| 2008/0009344 A1 | 1/2008 | Graham et al. |
| 2008/0015013 A1 | 1/2008 | Gelman et al. |
| 2008/0022089 A1 | 1/2008 | Leedom |
| 2008/0026829 A1 | 1/2008 | Martin et al. |
| 2008/0026844 A1 | 1/2008 | Wells |
| 2008/0032801 A1 | 2/2008 | Brunet de Courssou |
| 2008/0039196 A1 | 2/2008 | Walther et al. |
| 2008/0051193 A1 | 2/2008 | Kaminkow et al. |
| 2008/0066111 A1 | 3/2008 | Ellis et al. |
| 2008/0076505 A1 | 3/2008 | Nguyen et al. |
| 2008/0076506 A1 | 3/2008 | Nguyen et al. |
| 2008/0076572 A1* | 3/2008 | Nguyen .................. G07F 17/32 463/42 |
| 2008/0085752 A1 | 4/2008 | Okada |
| 2008/0096628 A1 | 4/2008 | Czyzewski et al. |
| 2008/0096659 A1 | 4/2008 | Kreloff et al. |
| 2008/0102956 A1* | 5/2008 | Burman ............. G06Q 20/3224 463/42 |
| 2008/0102957 A1 | 5/2008 | Burman et al. |
| 2008/0108370 A1 | 5/2008 | Aninye |
| 2008/0108423 A1 | 5/2008 | Benbrahim et al. |
| 2008/0113785 A1 | 5/2008 | Alderucci et al. |
| 2008/0113786 A1 | 5/2008 | Alderucci et al. |
| 2008/0113787 A1 | 5/2008 | Alderucci et al. |
| 2008/0113816 A1 | 5/2008 | Mahaffey et al. |
| 2008/0132251 A1 | 6/2008 | Altman et al. |
| 2008/0139306 A1 | 6/2008 | Lutnick et al. |
| 2008/0146323 A1 | 6/2008 | Hardy et al. |
| 2008/0147546 A1 | 6/2008 | Weichselbaumer |
| 2008/0150678 A1 | 6/2008 | Giobbi et al. |
| 2008/0182644 A1 | 7/2008 | Lutnick |
| 2008/0195664 A1 | 8/2008 | Maharajh et al. |
| 2008/0207302 A1 | 8/2008 | Lind et al. |
| 2008/0214261 A1 | 9/2008 | Alderucci |
| 2008/0218312 A1 | 9/2008 | Asher et al. |
| 2008/0220871 A1 | 9/2008 | Asher et al. |
| 2008/0221396 A1 | 9/2008 | Garces et al. |
| 2008/0221714 A1 | 9/2008 | Schoettle |
| 2008/0224822 A1 | 9/2008 | Asher et al. |
| 2008/0254897 A1 | 10/2008 | Saunders et al. |
| 2008/0305856 A1 | 12/2008 | Walker et al. |
| 2008/0305867 A1 | 12/2008 | Guthrie |
| 2008/0311994 A1 | 12/2008 | Amaitis et al. |
| 2008/0318670 A1 | 12/2008 | Zinder et al. |
| 2009/0005061 A1 | 1/2009 | Ward |
| 2009/0049542 A1 | 2/2009 | DeYonker et al. |
| 2009/0055204 A1 | 2/2009 | Pennington et al. |
| 2009/0077645 A1 | 3/2009 | Kottahachchi |
| 2009/0088180 A1 | 4/2009 | Lamance et al. |
| 2009/0088232 A1 | 4/2009 | Amaitis et al. |
| 2009/0098925 A1 | 4/2009 | Gagner et al. |
| 2009/0117989 A1 | 5/2009 | Arezina et al. |
| 2009/0149233 A1 | 6/2009 | Strause et al. |
| 2009/0163272 A1 | 6/2009 | Baker et al. |
| 2009/0167554 A1 | 7/2009 | Munje |
| 2009/0170519 A1 | 7/2009 | Wilhoite et al. |
| 2009/0178118 A1 | 7/2009 | Cedo et al. |
| 2009/0183208 A1 | 7/2009 | Christensen et al. |
| 2009/0197684 A1 | 8/2009 | Arezina et al. |
| 2009/0204905 A1 | 8/2009 | Toghia |
| 2009/0209233 A1 | 8/2009 | Morrison |
| 2009/0247285 A1 | 10/2009 | Gagner |
| 2009/0309709 A1 | 12/2009 | Bevacqua |
| 2009/0312032 A1 | 12/2009 | Bornstein et al. |
| 2009/0312095 A1 | 12/2009 | Durham |
| 2009/0325708 A9 | 12/2009 | Kerr |
| 2010/0023372 A1 | 1/2010 | Gonzalez |
| 2010/0062834 A1 | 3/2010 | Ryan |
| 2010/0069144 A1 | 3/2010 | Curtis |
| 2010/0069158 A1 | 3/2010 | Kim |
| 2010/0075760 A1 | 3/2010 | Shimabukuro et al. |
| 2010/0113143 A1 | 5/2010 | Gagner et al. |
| 2010/0125673 A1 | 5/2010 | Richardson |
| 2010/0127919 A1 | 5/2010 | Curran et al. |
| 2010/0153511 A1 | 6/2010 | Lin |
| 2010/0205255 A1 | 8/2010 | Alderucci |
| 2010/0211431 A1 | 8/2010 | Lutnick |
| 2010/0227691 A1 | 9/2010 | Karsten |
| 2010/0240455 A1 | 9/2010 | Gagner et al. |
| 2010/0323715 A1 | 12/2010 | Winters |
| 2011/0029359 A1 | 2/2011 | Roeding |
| 2011/0035431 A1 | 2/2011 | Geary |
| 2011/0098059 A1 | 4/2011 | Qiu |
| 2011/0105213 A1 | 5/2011 | Irwin, Jr. et al. |
| 2011/0269520 A1 | 11/2011 | Amaitis et al. |
| 2012/0015735 A1 | 1/2012 | Abouchar et al. |
| 2012/0046110 A1 | 2/2012 | Amaitis et al. |
| 2012/0094769 A1 | 4/2012 | Nguyen et al. |
| 2012/0115505 A1 | 5/2012 | Miyake |
| 2012/0167180 A1 | 6/2012 | Lee et al. |
| 2012/0184349 A1 | 7/2012 | Barclay |
| 2012/0190452 A1 | 7/2012 | Weston et al. |
| 2012/0191407 A1 | 7/2012 | Kim |
| 2012/0230486 A1 | 9/2012 | Guerrero |
| 2012/0244945 A1 | 9/2012 | Kolo |
| 2013/0005486 A1 | 1/2013 | Amaitis et al. |
| 2013/0065672 A1 | 3/2013 | Gelman et al. |
| 2013/0065679 A1 | 3/2013 | Gelman et al. |
| 2013/0072295 A1 | 3/2013 | Alderucci et al. |
| 2013/0084933 A1 | 4/2013 | Amaitis et al. |
| 2013/0093627 A1 | 4/2013 | Cosman |
| 2013/0141275 A1 | 6/2013 | Abraham |

(56) References Cited

U.S. PATENT DOCUMENTS

| | | | |
|---|---|---|---|
| 2013/0157638 A1 | 6/2013 | Malmbak et al. |
| 2013/0165212 A1 | 6/2013 | Amaitis et al. |
| 2013/0165213 A1 | 6/2013 | Alderucci et al. |
| 2013/0165221 A1 | 6/2013 | Alderucci et al. |
| 2013/0178277 A1 | 7/2013 | Burman et al. |
| 2013/0210513 A1 | 8/2013 | Nguyen |
| 2013/0244742 A1 | 9/2013 | Amaitis et al. |
| 2013/0260878 A1 | 10/2013 | Saunders et al. |
| 2013/0344932 A1 | 12/2013 | Adams et al. |
| 2014/0057724 A1 | 2/2014 | Alderucci et al. |
| 2014/0113707 A1 | 4/2014 | Asher et al. |
| 2014/0200465 A1 | 7/2014 | McIntyre |
| 2014/0220514 A1 | 8/2014 | Waldron et al. |
| 2014/0228127 A1 | 8/2014 | Alderucci et al. |
| 2014/0288401 A1 | 9/2014 | Ouwerkerk et al. |
| 2014/0300491 A1 | 10/2014 | Chen |
| 2015/0080111 A1 | 3/2015 | Amaitis et al. |
| 2015/0141131 A1 | 5/2015 | Gelman et al. |
| 2015/0157947 A1 | 6/2015 | Amaitis et al. |
| 2015/0238857 A1 | 8/2015 | Amaitis et al. |
| 2016/0054838 A1 | 2/2016 | Amaitis et al. |
| 2016/0321864 A1 | 11/2016 | Burman et al. |
| 2017/0039806 A1 | 2/2017 | Alderucci |
| 2017/0069162 A1 | 3/2017 | Williams |
| 2017/0091435 A1 | 3/2017 | Alderucci |
| 2017/0144065 A1 | 5/2017 | Amaitis |
| 2020/0066092 A1 | 2/2020 | Amaitis et al. |

FOREIGN PATENT DOCUMENTS

| | | |
|---|---|---|
| DE | 31 29 550 A1 | 4/1982 |
| DE | 37 36 770 A1 | 5/1989 |
| DE | 43 16 652 A1 | 11/1994 |
| DE | 19922862 | 12/2000 |
| DE | 19944140 | 3/2001 |
| DE | 19952691 | 5/2001 |
| DE | 19952692 | 5/2001 |
| DE | 10060079 | 6/2002 |
| EP | 0 840 639 B1 | 7/1996 |
| EP | 0 506 873 B1 | 3/2000 |
| EP | 1045346 | 10/2000 |
| EP | 1063622 | 12/2000 |
| EP | 1 066 868 A2 | 1/2001 |
| EP | 1066867 | 1/2001 |
| EP | 1120757 | 1/2001 |
| EP | 1 202 528 A3 | 5/2002 |
| EP | 1217792 | 6/2002 |
| EP | 1231577 | 8/2002 |
| EP | 1291830 A2 | 3/2003 |
| EP | 1 475 755 A1 | 12/2003 |
| EP | 1 475 756 A2 | 11/2004 |
| EP | 1480102 A2 | 11/2004 |
| EP | 1 531 646 A1 | 5/2005 |
| EP | 1782640 | 5/2007 |
| EP | 1480102 A3 | 10/2008 |
| GB | 2 248 404 | 4/1992 |
| GB | 2 256 594 | 12/1992 |
| GB | 2 391 432 | 2/2004 |
| GB | 2 391 767 | 2/2004 |
| GB | 2394675 | 5/2004 |
| GB | 2 406 291 | 3/2005 |
| JP | H11-220766 | 1/1988 |
| JP | 5-317485 | 12/1993 |
| JP | H07-281780 | 10/1995 |
| JP | H09-182143 | 7/1997 |
| JP | 2000-69540 | 8/1998 |
| JP | 2000049046 | 2/2000 |
| JP | 2000-160016 | 6/2000 |
| JP | 200218125 | 7/2000 |
| JP | 200326491 | 10/2000 |
| JP | 200345435 | 11/2000 |
| JP | 200387614 | 12/2000 |
| JP | 2001-70658 | 3/2001 |
| JP | 2001-204971 | 7/2001 |
| JP | 2001-204972 | 7/2001 |
| JP | 2001/212363 | 8/2001 |
| JP | 2001 236458 | 8/2001 |
| JP | 2001-514909 | 9/2001 |
| JP | 2001-340656 | 12/2001 |
| JP | 2001-344400 | 12/2001 |
| JP | 2001-526550 | 12/2001 |
| JP | 2002 032515 | 1/2002 |
| JP | 2002-049681 | 2/2002 |
| JP | 2002-056270 | 2/2002 |
| JP | 2002107224 | 2/2002 |
| JP | 2002-109376 | 4/2002 |
| JP | 2002-123642 | 4/2002 |
| JP | 2002-66144 | 5/2002 |
| JP | 2002 133009 | 5/2002 |
| JP | 2002-135468 | 5/2002 |
| JP | 2002-175296 | 6/2002 |
| JP | 2002 189831 | 7/2002 |
| JP | 2002-253866 | 9/2002 |
| JP | 2002-263375 | 9/2002 |
| JP | 2002-279157 | 9/2002 |
| JP | 2002-292113 | 10/2002 |
| JP | 2003-053042 | 2/2003 |
| JP | 2003-062353 | 3/2003 |
| JP | 2003 078591 | 3/2003 |
| JP | 2003-518677 | 6/2003 |
| JP | 2003166050 | 6/2003 |
| JP | 2003-210831 | 7/2003 |
| JP | 2003-210852 | 7/2003 |
| JP | 2002024979 | 8/2003 |
| JP | 2004-38911 | 2/2004 |
| JP | 2004-86441 | 3/2004 |
| JP | 2004-136009 | 4/2004 |
| JP | 2004-512865 | 4/2004 |
| JP | 2002 149894 | 5/2004 |
| JP | 2004-261202 | 9/2004 |
| JP | 2004-321558 | 11/2004 |
| JP | 2004-329948 | 11/2004 |
| JP | 2004-536638 | 12/2004 |
| JP | 2005-027853 | 2/2005 |
| JP | 2005-073711 | 3/2005 |
| JP | 2006-072468 | 3/2006 |
| JP | 2007-011420 | 1/2007 |
| JP | 5639328 | 10/2014 |
| RU | 2190477 | 10/2002 |
| WO | WO93/10508 | 5/1993 |
| WO | WO 94/10658 | 5/1994 |
| WO | WO 94/16416 | 7/1994 |
| WO | WO 95/24689 | 9/1995 |
| WO | WO 95/30944 | 11/1995 |
| WO | WO97/44750 | 11/1997 |
| WO | WO 99/04873 A1 | 2/1999 |
| WO | WO 99/08762 A1 | 2/1999 |
| WO | WO 99/12135 | 3/1999 |
| WO | WO 99/19027 | 4/1999 |
| WO | WO99/42964 | 8/1999 |
| WO | WO 99/52077 | 10/1999 |
| WO | WO 1999/055102 | 10/1999 |
| WO | WO 00/77753 A1 | 12/2000 |
| WO | 01/20538 | 3/2001 |
| WO | WO 01/17262 A1 | 3/2001 |
| WO | WO 02/37246 | 5/2001 |
| WO | WO 01/40978 A2 | 6/2001 |
| WO | WO 01/48712 A1 | 7/2001 |
| WO | WO 01/48713 | 7/2001 |
| WO | WO 01/48713 A1 | 7/2001 |
| WO | WO 01/54091 | 7/2001 |
| WO | 01/67218 | 9/2001 |
| WO | WO 01/77861 | 10/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/31739 | 4/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |

(56) References Cited

FOREIGN PATENT DOCUMENTS

| | | |
|---|---|---|
| WO | WO 02/077931 A1 | 10/2002 |
| WO | WO02/101486 | 12/2002 |
| WO | WO 02/101486 A3 | 12/2002 |
| WO | WO 2003/005743 | 1/2003 |
| WO | 03/015299 A1 | 2/2003 |
| WO | WO 03/013678 A1 | 2/2003 |
| WO | WO 2003/015299 | 2/2003 |
| WO | WO 03/021543 | 3/2003 |
| WO | WO 03/027970 A2 | 4/2003 |
| WO | 03/045519 | 6/2003 |
| WO | 03/081447 | 10/2003 |
| WO | WO 2004/000428 A1 | 12/2003 |
| WO | WO 2004/003810 A1 | 1/2004 |
| WO | WO 2004/013820 | 2/2004 |
| WO | WO 2004/014506 A1 | 2/2004 |
| WO | WO 2004/023253 A3 | 3/2004 |
| WO | 2004/027689 A2 | 4/2004 |
| WO | WO 2004/027689 | 4/2004 |
| WO | WO 2004/034223 | 4/2004 |
| WO | WO 2004/073812 A2 | 9/2004 |
| WO | WO 2004/095383 | 11/2004 |
| WO | WO 2004/104763 A2 | 12/2004 |
| WO | WO 2004/109321 | 12/2004 |
| WO | WO 2004/114235 A1 | 12/2004 |
| WO | WO 2005/001651 | 1/2005 |
| WO | WO 2005/015458 A1 | 2/2005 |
| WO | WO 2005/022453 | 3/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | 1259930 B1 | 6/2005 |
| WO | WO 2005/050574 A2 | 6/2005 |
| WO | WO 2005/082011 | 9/2005 |
| WO | WO 2005/085980 | 9/2005 |
| WO | WO 2005/098650 | 10/2005 |
| WO | 2006/023230 | 3/2006 |
| WO | WO 2007/008601 A2 | 1/2007 |
| WO | WO 2007/008714 | 1/2007 |
| WO | WO97/19537 | 5/2007 |
| WO | WO 2008/005264 | 1/2008 |
| WO | WO 2008/016610 | 2/2008 |
| WO | WO 2008/024705 | 2/2008 |
| WO | WO 2012/021806 | 8/2010 |

OTHER PUBLICATIONS

Janna Lindsjö, et al.; GIGANT—an Interactive, Social, Physical and Mobile Game; PDC 2002 Proceedings of the Participatory Design Conference; Malmö, Sweden; 5 pages; Jun. 23-25, 2002.
Stephan Neuert, et al.; The British Library; *Delivering Seamless Mobile Services Over Bluetooth*; 11 pages; date unknown.
Business Wire; *Home Gambling Network Inc., With U.S. Pat. No. 5,800,268—Business/Gambling—HGN and UUNET, a WorldCom/ MCI Company, Reach a Mutually Satisfactory Resolution in Patent Suit*; 2 pages; Mar. 19, 1999.
PR Newswire; *Nokia N-Gage (TM) Mobile Game Deck—The Revolutionary Gaming Experience; Major Global Games Publishers Excited to Publish on Wireless Multiplayer Platform*; 3 pages; Feb. 6, 2003.
Business Wire; *GoldPocket Interactive Launches EM Mobile Matrix, Industry's First Fully Synchronous Interactive Television and Massively Multi-Player Gaming Solution*; 2 pages; Mar. 17, 2003.
Brand Strategy; *The National Lottery has announced that UK consumers will be able to purchase tickets using the internet, TV and Mobile phones*. (Launches & Rebrands); ISSN 0965-9390; 1 page; 04/00/2003.
PR Newswire; *Ideaworks3D appointed by Eidos Interactive to Develop Blockbuster Line-up for Nokia N-Gage Mobile Game Deck*; 2 pages; May 23, 2003.
Telecomworldwire; *New mobile lottery service launched by mLotto*; 1 page; Oct. 30, 2003.
Singh, et al.; *Anywhere, Any-Device Gaming*; Human Interface Technology Laboratory; National University of Singapore; 4 pages; 2004.
Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.
*Precision Marketing*; vol. 16, No. 11; ISSN 0955-0836; 2 pages; Jan. 9, 2004.
Online Reporter; *GTECH Takes Lottery Mobile*; 1 page; Feb. 28, 2004.
Personal and Ubiquitous Computing; *Human Pacman: a mobile, wide-area entertainment system based on physical, social, and ubiquitous computing*; 12 pages; May 2004.
PR Newswire; *M7 Networks Partners With Terraplay to Deliver Real-Time Multiplayer Gaming Functionality to Its Community Services Offerings*; 2 pages; Jun. 1, 2004.
China Telecom; *Win Win Gaming Inc. announces agreement to provide wireless lottery and entertainment content in Shanghai*; vol. 11, No. 9; 2 pages; 09/00/2004.
Business Wire; *EA Announces Next Step Into Mobile Gaming; Digital Bridges Named as Strategic Partner for Distribution of Mobile Interactive Entertainment in Europe, North and South America*; 3 pages; Sep. 2, 2004.
Wireless News; *Mobile Casinos, Lotteries Good News for Mobile Revenues*; 2 pages; Feb. 23, 2005.
Business Wire; *MobileGamingNow, Inc. Announces the Launch of the First Ever Mobile Phone Interactive, Multi-Player Gaming System for Poker*; 2 pages; Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages; Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages; May 4, 2005.
Gaming Labs Certified™; Standard Series; *GLI-26: Wireless Gaming System Standards*; Version: 1.1; 28 pages; Jan. 18, 2007.
Gaming Labs Certified™; Standard Series; *GLI-11: Gaming Devices in Casinos*; Version: 2.0; 96 pages; Apr. 20, 2007.
Gaming Labs Certified™; Standard Series; *GLI-21: Client-Server Systems*; Version: 2.1; 85 pages; May 18, 2007.
Yampolskiy et al., 2006, "Use of Behavioral Biometrics in Intrusion detection and Online Gaming", Biometric technology for Human Identification III, edited by Patrick J. Flynn, Sharath Pankanti, Proc. Of SPIE vol. 6202, 62020U-1-10.
Hiroshi Kakii, Complete illustration for understanding the latest i-mode, Gijutsu-Hyohron Co. Ltd., Sep. 29, 2000. Second Print of the first edition, p. 36-37, 48-49, 62-63, 78-83, 94-95, and 108-111.
"Probability, Odds, and Random Chance", Problem Gambling Institute of Ontario, retrieved from Internet on Jan. 27, 2014 <http://www.problemgambling.ca/en/resourcesforprofessionals/pages/probabilityoddsandrandomchance.aspx>.
"Changing Probability To Odds", Math Magic, retrieved from Internet on Jan. 27, 2014 <http://www.mathmagic.com/probability/prob_to_odds.htm>.
"Craps From Wikipedia, the free encyclopedia", Wikipedia, retrieved from Internet on Jan. 27, 2014 <http://en.wikipedia.org/wiki/Craps#8et_odds_and_summary>.
Bahl and Padmanabhan, 2000, "RADAR: An In-Building RF-based User Location and Tracking System", Microsoft Research, p. 775-784.
Personal authentication through biometric technologies, Podio et al, IEEE 2002.
Digital Chips for an on-line casino, Castell'a-Roca et al, IEEE 2005.
"An experimental comparison of secret-based user authentication technologies", Irakdeous et al.—Information Management & Computer Security, 2002, 1, 2/3 ABI/INFORM Global, pp. 100-108.
Front Mission Online playing manual 2005, Square Enix, accepted by the Japanese Patent Office dated May 13, 2005, p. 017.

(56) References Cited

OTHER PUBLICATIONS

Final Fantasy XI phantom of Jirart for Windows playing manual 2005, Square Enix, accepted by the Japan Patent Office dated Mar. 31, 2005, p. 029.
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).
Case 2:16-cv-00871-RCJ-VCF, Document 40, "Reply in Support of Motion to Dismiss Under 35 U.S.C. §101" filed Sep. 26, 2016 (14 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).
Case 2:16-cv-00871-RCJ-VCF, Document 55, Reply in Support of Defendants' Motion to Dismiss Under Fed. R. Civ. P. 12(B)(6), filed Nov. 30, 2016 (6 pages).
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00801-JCM-VCF, Document 1, "Plaintiffs' Complaint for Patent Infringement" filed Apr. 8, 2016 (31 pages).
Case 2:16-cv-00801-RCJ-VCF, Document 31, "Plaintiffs' First Amended Complaint for Patent Infringement" filed Jun. 13, 2016 (48 pages).
Case 2:16-cv-00801-RCJ-VCF, Document 32, "Index of Exhibits to Plaintiffs' First Amended Complaint for Patent Infringement" filed Jun. 13, 2016 (3 pages).
Case 2:16-cv-00801-RCJ-VCF Document 44, "Defendant Fanduel, Inc's Motion to Dismiss for Failure to State a Claim Upon Which Relief Can be Granted" filed Jul. 14, 2016 (18 pages).
Case 2:16-cv-00801-RCJ-VCF Document 75, "Defendant Fanduel, Inc's Motion for Leave to Supplement Briefing Under LR 7-2(g)" filed Sep. 22, 2016 (3 pages).
Case 2:16-cv-00801-RCJ-VCF Document 77, "Plaintiffs' Opposition to Defendant Fanduel, Inc.'s Motion for Leave [ECF No. 75]" filed Oct. 11, 2016 (4 pages).
Case 2:16-cv-00801-RCJ-VCF Document 81, "Defendant Fanduel Inc.'s Notice of Withdrawal of Motion Seeking Leave to File Supplemental Briefing" filed Oct. 20, 2016 (3 pages).
Case 2:16-cv-00801-RCJ-VCF Document 86, "Plaintiffs' Second Amended Complaint for Patent Infringement" filed Nov. 16, 2016 (70 pages).
Case 2:16-cv-00801-RCJ-VCF Document 87, "Defendant Fanduel's Answer to Plaintiffs' Second Amended Complaint and Affirmative Defenses" filed Nov. 30, 2016 (19 pages).
Case 2:16-cv-00801-RCJ-VCF Document 88, "Defendant's Partial Motion to Dismiss CGT's Second Amended Complaint for Failure to State a Claim Upon Which Relief Can Be Granted" filed Nov. 30, 2016 (14 pages).
Case 2:16-cv-00801-RCJ-VCF Document 94, "Plaintiffs' Opposition to Fanduel, Inc.'s Partial Motion to Dismiss" filed Dec. 19, 2016 (11 pages).
Case 2:16-cv-00801-RCJ-VCF Document 103, "Fanduel, Inc.'s Reply in Support of Partial Motion to Dismiss" filed Dec. 27, 2016 (7 pages).
Case 2:16-cv-00801-RCJ-VCF Document 113, "Order" filed Jan. 4, 2017 (11 pages).
Case 2: 16-cv-801-RCJ-VCF Document 114, "Transcript of Pretrial Conference" filed Dec. 2, 2016 (54 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendant's Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).
Case 2:16-cv-00781-MMD-CWH, Document 59, "Order" filed Sep. 27, 2016 (3 pages).
Case 2:16-cv-00781-RCJ-VCF, Document 64, "Plaintiffs Motion to Lift Stay" filed Nov. 23, 2016 (6 pages).
Case 2:16-cv-00781-RCJ-VCF, Document 69, "Order" filed Dec. 12, 2016 (11 pages).
Case 2:16-cv-00781-RCJ-VCF, Document 72, "DraftKings' Answer to Plaintiffs' First Amended Complaint and Affirmative Defenses" filed Dec. 27, 2016 (29 pages).
Patent Owner's Response for U.S. Pat. No. 9,355,518, IPR 2017-01532 filed Mar. 9, 2018, 33 pages.
Patent Owner's Response for U.S. Pat. No. 9,306,952, IPR 2017-01333 filed Jan. 29, 2018, 40 pages.

* cited by examiner

MULTI-PROCESS COMMUNICATION REGARDING GAMING INFORMATION

CROSS REFERENCE TO RELATED APPLICATIONS

This application is a continuation of U.S. patent application Ser. No. 14/622,325 filed Feb. 13, 2015, which is a continuation of U.S. patent application Ser. No. 13/070,893 filed Mar. 24, 2011, (now U.S. Pat. No. 8,956,231) which claims priority to U.S. Provisional Patent Application No. 61/373,435 filed on Aug. 13, 2010; U.S. Provisional Patent Application No. 61/405,309 filed on Oct. 21, 2010; U.S. Provisional Patent Application No. 61/405,439 filed on Oct. 21, 2010; U.S. Provisional Patent Application No. 61/413,098 filed on Nov. 12, 2010; and U.S. Provisional Patent Application No. 61/413,089 filed on Nov. 12, 2010, which are all incorporated herein by reference in their entirety

FIELD

Some embodiments may generally relate to gaming and/or mobile devices.

FIELD

Mobile devices, such as cellular telephones, PDAs, notebook computers, and/or various other devices may be used by individuals.

Gaming, such as casino gaming, sports wagering, video gaming, and/or various other forms of gaming may be performed.

SUMMARY

The following should be understood as example embodiments, and not as claims.

A. An apparatus comprising: a machine readable medium having stored thereon a set of instructions that are configured to cause a processor to: determine that a device is authorized to use a gaming service; determine that a user of the device is authorized to use the gaming service; determine that the device is associated with a first location in which gaming activity is allowed; allow gaming activity based on the determination that the device is authorized, the determination that the user is authorized, and the determination that the device is associated with the first location; determine a period of time at which a determination that the device is associated with a second location should be made based on a distance of the first location from a boundary of an area; determine that the period of time has passed; and in response to determining that the period of time has passed, determine whether the device is associated with a second location in which gaming activity is allowed.

A.1. The apparatus of claim A, in which the instructions are configured to cause the processor to continue to allow the gaming activity in response determining that the device is associated with the second location. A.2. The apparatus of claim A, in which the instructions are configured to cause the processor to prevent the gaming activity in response to determining the device is associated with a third location in which gaming activity is not allowed. A.3. The apparatus of claim A, in determining that the device is authorized include determining that a mobile telephone number of the device has been signed up for the gaming service. A.4. The apparatus of claim A, in which determining that the user is authorized includes authenticating a login and password. A.5. The apparatus of claim A, in which determining that the device is associated with the first location in which gaming activity is allowed includes querying a geofencing service. A.6. The apparatus of claim A, further comprising the processor. A.7. The apparatus of claim A, in which determining the period of time includes determining a period of time that is larger when the distance is larger and smaller when the distance is smaller A.8. The apparatus of claim A, in which determining the period of time includes determining a period of time that is proportionate to the distance.

A.9. The apparatus of claim A, in which determining the period of time includes determining the period of time based on a speed and the distance. A.9.1. The apparatus of claim A, in which determining the period of time includes determining a period of time that is proportional to the speed and the distance. A.9.2. The apparatus of claim A, in which the instructions are configured to cause the processor to determine a location prior to the first location and determining the speed based on the first location and the prior location. A.10. The apparatus of claim A, in which the period of time includes a period of time that is greater when the boundary includes a boundary of a state than when the boundary includes a boundary within a state. A.11. The apparatus of claim A, in which the boundary includes a boundary of a geofence.

B. An apparatus comprising: a mobile device configured to transmit gaming requests to a gaming service, communicate through a communication service, and provide a user interface to a customer; and the gaming service, in which the gaming service is configured to: determine that the mobile device is authorized to use the gaming service; determine that the customer is authorized to use the gaming service; determine that the device is associated with a first location in which gaming activity is allowed; allow gaming activity based on the determination that the device is authorized, the determination that the user is authorized, and the determination that the device is associated with the first location; determine a period of time at which a determination that the device is associated with a second location should be made based on a distance of the first location from a boundary of an area; determine that the period of time has passed; and in response to determining that the period of time has passed, determine whether the device is associated with a second location in which gaming activity is allowed. B.1. The apparatus of claim B, in which the gaming service includes one or more servers. B.2. The apparatus of claim B, in which the mobile device includes a cellular telephone and the communication service includes a cellular phone service.

DETAILED DESCRIPTION

Figure 1:
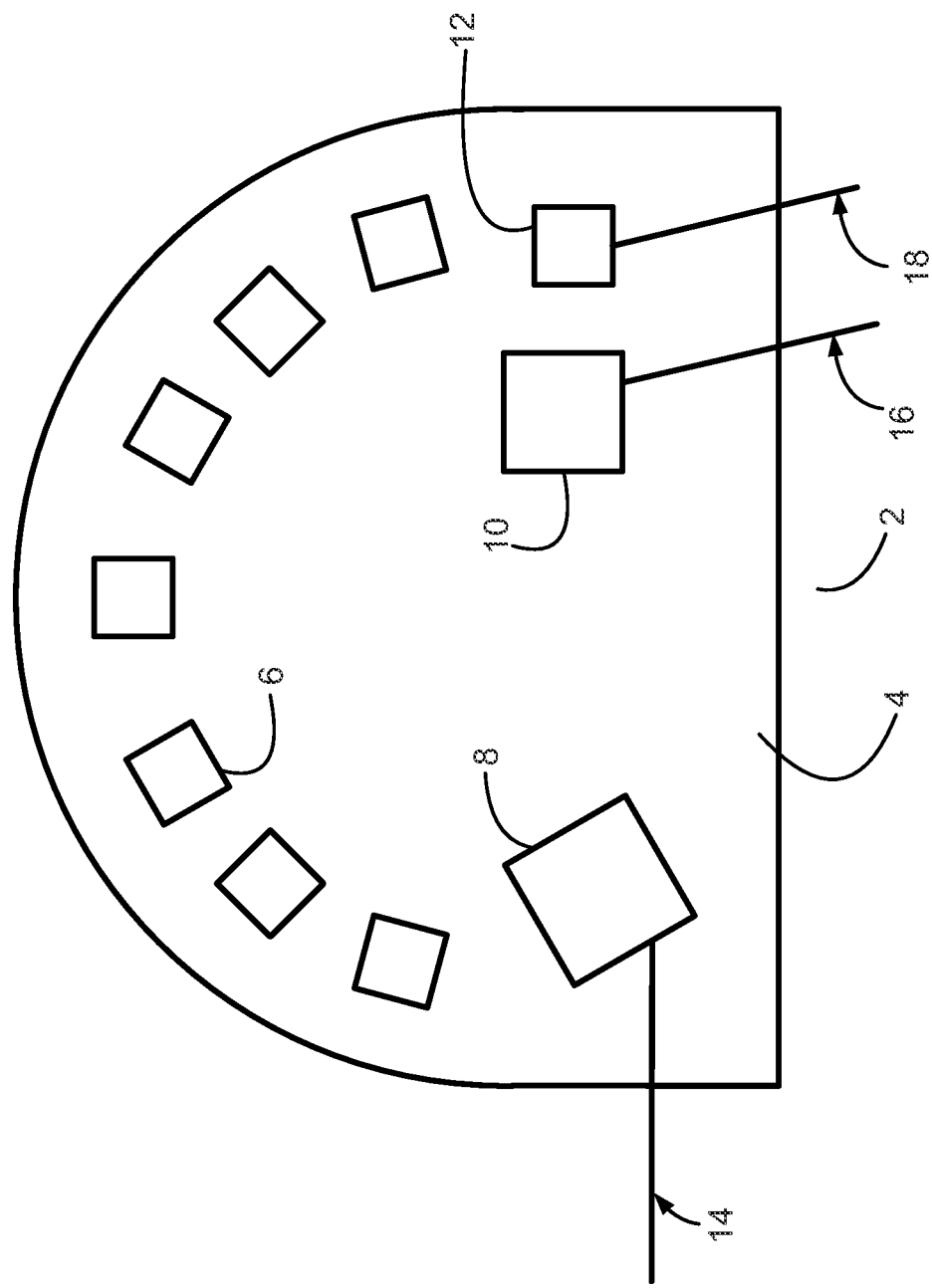
FIG. 1 shows a block diagram of a hand-reading system of some embodiments.

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth®, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. CARDS

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. RULES OF CARD GAMES

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10 ♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♥ 6♥ 5♥ 4♥ 3♥ beats 5♣ 4♣ 3♣ 2♣ A♣

J♣ 10♣ 9♣ 8♣ 7♣ ties J♦ 10♦ 9♦ 8♦ 7♦

Four of a Kind

Four of a kind, or quads, is a poker hand such as 9♣9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♣ 10♥ 10♦ 4♣ 4♦ ("tens full") defeats 9♥ 9♣ 9♠ A♥ A♣ ("nines full")

K♠ K♣ K♥ 3♠ 3♣ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♠ 2♠ A♣, called a wheel or five-high straight, which ranks below the six-high straight 6♠ 5♠ 4♣ 3♥ 2♥. The ace may not "wrap around", or play both high and low in the same hand: 3♣ 2♦ A♠ K♣ Q♠ is not a straight, but just ace-high no pair.

Examples

8♠ 7♣ 6♥ 5♥ 4♠ ("eight-high straight") defeats 6♦ 5♠ 4♠ 3♥ 2♣ ("six-high straight")

8♠ 7♣ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♠ ("three fives")

8♠ 8♥ 8♦ A♣ 2♦ ("three eights, ace kicker") defeats 8♠8♥ 8♦ 5♠ 3♣ ("three eights, five kicker")

Two Pair

A poker hand such as J♥ J♠ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♠) and the lower pair (e.g., 9♠ 9♦), as in "Kings over nines", "Kings and nines" or simply "Kings up".

Examples

K♥ K♦ 2♣ 2♦ J♥ ("kings up") defeats J♦ J♠ 10♣ 10♣ 9♠ ("jacks up")

9♠ 9♦ 7♠ 7♣ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♠ A♥ Q♦ 10♦ ("pair of nines")

10♥ 10♦ J♦ 3♥ 2♠ ("tens with jack kicker") defeats 10♣ 10♠ 6♠ 4♥ 2♥ ("tens with six kicker")

2♦ 2♥ 8♠ 5♠ 4♣ ("deuces, eight-five-four") defeats 2♠ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♠ 4♣ ("ace high") defeats K♠ Q♦ J♣ 8♥ 7♥ ("king high")

A♣ Q♣ 7♠ 5♥ 2♠ ("ace-queen") defeats A♦ 10♦ 9♠ 5♣4♣ ("ace-ten")

7♦ 6♠ 5♠ 4♦ 2♥ ("seven-six-five-four") defeats 7♣ 6♦ 5♠ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that may qualify. As the dealer's hand is partially concealed during play (usually only one card, at most) is displayed to the player before player wagering is complete), the player may always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added.

To "hit" is to take another card. To "stand" is to take no more cards. To "double down" is to double the wager, take precisely one more card and then "stand." When a player has identical value cards, such as a pair of 8 s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer may hit until he has a point total of at least 17, regardless of what the players have. In most casinos, the dealer may also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4 s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. TRACKING THE ACTION AT A TABLE

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Further more, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. FOLLOWING THE BETS

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of some embodiments of the invention may encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of some embodiments of the invention may be able to address the needs of identifying hands in each of these types of games and especially may be able to identify hands in the a complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217, 447; 5,941,769; 6,229,536; 6,460,848; 5,722,893; 6,039, 650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified.

Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer may play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the $73^{rd}$ hand dealt). This date stamping of hands or even cards in memory can be used as an analytical search tool for security and to enhance hand identification.

FIG. 1 shows a block diagram of the minimum components for the hand-reading system on a table 4 of some embodiments, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-B all Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. CARD SHUFFLERS

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. CASINO COUNTERMEASURES

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. VIDEO WAGERING GAMES

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVIII. APPARATUS FOR PLAYING OVER A COMMUNICATIONS SYSTEM

Figure 2:
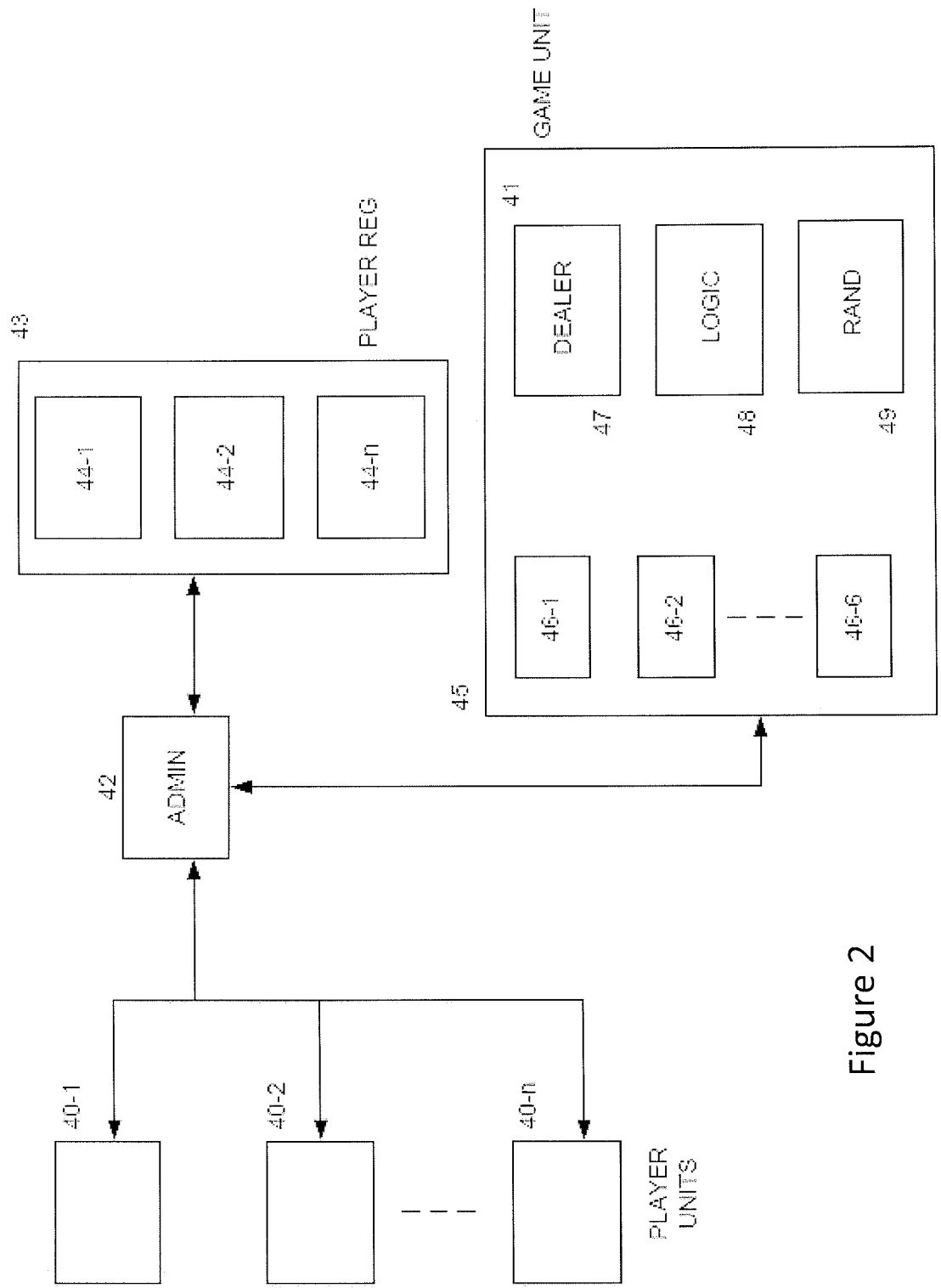
FIG. 2 shows apparatus for playing a game in some embodiments.

FIG. 2 shows apparatus for playing the game. There is a plurality of player units 40-1 to 40-$n$ which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-$n$ for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. REFERENCES

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, 7,137,629, U.S. patent application Ser. No. 11/063,311.

XXI. EXAMPLE EMBODIMENTS

Some embodiments may facilitate gaming on one of more mobile devices. Some embodiments may allow such gaming when a mobile device and/or customer is in a jurisdiction and/or area in which gaming (e.g., gambling) is legal. Some embodiments may allow such gaming when a mobile device and/or customer is properly authorized and/or controlled. In some embodiments, various procedures and/or apparatus may be used to ensure security, authenticity, and/or locations of a customer and/or device Gaming may be facilitated, in some embodiments, over a cellular network, a wireless communication network, and/or any desired communication network. In some embodiments, when in location where such gaming is allowed, when a device is properly authorized and/or controlled, a customer may operate a mobile device to place one or more wagers from a wagering or other account over the communication network.

In some embodiments, gaming may include, for example, sports betting, casino betting, proposition betting, and/or other betting. In some embodiments, gaming may include gaming from a wagering account, a credit card, using cash, on credit, and so on. In some embodiments, jurisdictions and/or areas in which gaming may be allowed may include, for example, casino floors, the state of Nevada, outside of hotel rooms, outside of residences, the city of Atlantic City, and so on. It should be recognized that while some embodiments are described in terms of sports wagering, cellular networks, and/or particular areas, that these embodiments are given as examples only and that other embodiments may include any desired types of wagering, any desired types of communication networks, and/or any desired area(s).

Some embodiments may include technology configured to facilitate a customer placing a bet over a communication network using a mobile device if the customer is in a location where placing the bet is legal and/or otherwise allowed (e.g., the state of Nevada). Some embodiments may include technology configured to prevent a customer from placing a bet over a communication network using a mobile device if the customer is not in a location where placing the bet is legal and/or otherwise allowed (e.g., may be prevented from wagering, may be prevented from logging into an account, may be logged out of an account when outside of a legal gaming area, and so on). In some embodiments, gaming related services may be provided and/or prevented outside of legal gaming areas as desired and/or as allowed in respective areas. Such gaming related services may include providing betting lines, score updates, account information, and so on. In some embodiments, a location of a mobile device may be used as a proxy for a location of a customer. References to a location may be understood as a location of a mobile device (e.g., a determined location, an approximate location).

Some embodiments may include one or more technologies that may be used to determine a location of a customer and/or mobile device. One example technology may include a geofencing technology. For example, a gaming operator may determine that the customer is playing in Nevada by using geofence capability (e.g., Sprint geofencing services). In some embodiments, to implement a geofencing technology, a gaming operator may work with Sprint, another geofencing provider, and/or a third party provider to ensure that desired locations are geofenced (e.g., the city of Las Vegas, Reno, Tahoe and/or other gaming locations within the state of Nevada and/or elsewhere). Customers may be allowed to engage in mobile gaming if they (e.g., a device they are using) are physically inside the approved boundaries. Customers may be prevented from engaging in mobile gaming if they are not physically inside the approved boundaries. The service may be offered to Sprint customers and/or customers of any desired cellular and/or other network service provider.

Authentication Examples

Some embodiments may include an authentication method. Such an authentication method may be designed to provide a desired level of confidence that a mobile device is not being accessed remotely, a mobile device has not been hacked, and/or a mobile device is at a location where gaming is allowed. Such a method may be used to provide a level of confidence that a user is actually present at a mobile device, that the user is actually using the mobile device, and/or that the user is located at the location.

Although many different methods may be used, one example method may include two example processes, for example: an initial sign up and/or device authorization (e.g., establish a link between a device and a player, and/or establish a wagering account), and an application security handshake and/or continuous validation (e.g., occasionally verify that software is unaltered and/or that a person associated with an account is still using a device). Such processes may be independent, dependent, a same process, different processes, arranged in any manner and/or performed by any desired apparatus and/or people.

Sign Up and/or Authorization Examples

Some embodiments may include an initial sign up and/or device authorization process. Such a process may include establishing a link between a device and a player (e.g., an entry in a database that identifies that a particular player is associated with particular device). Such a process may include establishing a wagering account for a player (e.g., establishing an account into which a player may place money and/or from which a player may place wagers). Such a process may allow a customer to sign up for a gaming service. After such a process is performed, a player and/or a device may be authorized to place wagers (e.g., over a communication network, with a particular gaming operator that performs at least a part of the process, and so on).

Some embodiments may include a customer signing up for a mobile gaming service with a gaming operator. Such a signup process may be performed, at least in part, at a casino (e.g., by a casino employee, at a kiosk, in person, etc.), through a website (e.g., accessed by the mobile device, accessed by another device), in person (e.g., at a kiosk, at a casino), remotely (e.g., through a website, at a kiosk in a store).

In some embodiments, signing up for a mobile gaming service may include opening a wagering account, and/or associating an account with an ability to wager. For example, a new account may be established that a user may place money into and from which a user may access money to place wagers. In some embodiments, such an account may include a bank account, a credit account, and/or any account hat may be created or have already existed that may be associated with a gaming service.

In some embodiments, signing up for a mobile gaming service may include identifying a user and/or a mobile device that may access a gaming service. For example, a user may be authorized to access the gaming service using the device. A user may establish name, age, and/or other information. A device may be established as meeting criteria, being reliable, and/or having other traits.

In some embodiments, a sign up process may include determining customer information. Such customer information may be entered into a computing device by a customer, by an agent of a gaming service, and so on. Such information may include a name, an age, a social security number, a driver's license number, a bank account number, an amount of money, and/or any information that may be desired and/or need to establish an account and/or allow wagering in a desired area. Such a computing device may include a device authenticator service providing device, which may be referred to herein as a DAS.

In some embodiments, at least a part of a sign up process may be required to be completed in person at a location of a gaming operator and/or agent of a gaming operator. For example, in some embodiments, an entire sign up process may be required to be performed in person. As another example, a sign up of a person to verify eligibility to wager (e.g., verify age) may be required to be performed in person. In some embodiments, an application to use a mobile gaming service may be required to be made in person and a customer may be required to provide a valid proof of identification, proof of residence, social security number, and/or any other desired proof of information to sign up for a service. In some embodiments, a customer may be denied an application to sign up for a mobile gaming service if they are under 21 years of age, do not meet a residency requirement, do not provide proper proof of identification, do not meet a sobriety requirement, and/or do not meet any other desired requirement.

In some embodiments, a sign up process may include establishing an ability for a user to access an account in the future. For example, a user name and password may be established. In some embodiments, a user name and mac address or phone number of a particular device may be used. In some embodiments, mac address or phone number of a device and password may be used. In some embodiments, a database may be established that includes entries for a user information, a device information, and/or any combination of user and/or device information that may be used to determine future access to a gaming service.

Some embodiments may include a minimum initial balance and/or deposit into a wagering account to sign up for a gaming service. In some embodiments, for example, a customer may be required to provide a minimum of $100.00 in cash to be placed in a new account established with the gaming operator in order to sing up for a mobile gaming service. It should be recognized that $100.00 is given as a non-limiting example and that other embodiments may include any minimum as desired (e.g., 1 cent, 10 dollars, 1 million dollars). It should be recognized that cash is given as a non-limiting example and that other embodiments may allow transactions to and/or from an account in a form of cash, personal checks, cashier's checks, wire transfers, money orders, debit cards, credit cards, electronic transfers of money at a casino cage, and/or any desired method. In some embodiments transfers to and/or from an account including initial and/or subsequent transfers may be made at a same location as a sign up process, through an agent of a gaming operator, on a website, and so on as desired.

Some embodiments may restrict a sign up process to being performed by a customer. For example, in some embodiments, no agents of a customer may be allowed to sign a customer up for a gaming service. In some embodiments, a sign up may be restricted to normal business hours of a sports book and/or other place of business of a gaming operator. In some embodiments, an agent of a customer may sign the customer up and/or a sign up may be performed at any time.

Some embodiments may include verifying a mobile device for use with a gaming service. Such verification may include, for example, determining an authenticity of software, determining an operating system version, determining a communication network, and/or any other actions as desired. Such verification may be performed in person by an agent of a gaming operator, remotely by software (e.g., software on the mobile device, software on a kiosk such as a kiosk to which a mobile device may be attached through a USB port and/or other wired and/or wireless communication method).

In some embodiments, a customer may physically provide a mobile device to an agent of a gaming operator for verification. In some embodiments, software on the gaming device may be executed to perform verification. In some embodiments, a third party and/or second machine may perform verification.

An entity performing verification may determine that a device is running an approved operating system. One example of an operating system that may be approved may include Android OS 2.2. Such a determination may be made by reading a memory location, comparing files, comparing an operating system with a listing of approved operating systems, and so on.

An entity performing verification may determine that a device is running on an approved communication network. One example communication network that may be approved may include a Sprint network. Such a determination may be performed by reading a memory location, contacting Sprint to compare a device identifier, comparing a communication network with a listing of approved communication networks, and so on.

An entity performing the verification may determine that an operating system running on the device is approved operating system for the communication network that the device is running on. For example, such a determination may include a determination that the device has not been rooted. Such a determination may include comparing a running operating system with a listing of approved operating systems for the communication network and device.

An entity performing verification may determine that a device is running and/or storing any desired programs and/or is not running and/or storing any undesired programs. For example, the entity may determine that the device is running an approved antivirus program. As another example, the entity may determine that the device is not running any undesired malware, and/or remote access technologies. Various examples of determining whether a device is remotely controlled are given elsewhere herein. Such a determination may include a search of a memory, a comparison of running and/or stored programs with a listing of approved and/or unapproved programs, and so on.

Some embodiments may include installing and/or enabling one or more services on a mobile device. Such installation and/or enabling may be performed in response to a verification of a device and/or a signing up of a user for a service. Such installing and/or enabling may be performed by an agent of a gaming operator, by a kiosk, by a gaming operator computing device, by a customer, by software running on the mobile device, and so on.

In some embodiments, an Android wrapper application and/or an AIR mobile gaming client may be installed on a mobile device. It should be recognized that such example programs are given as non-limiting examples only and that other embodiments may include any desired programs and/or no programs at all. For example, in some embodiments, rather than an Android wrapper application, a Win32 wrapper application may be installed, an Apple application may be installed, and so on. In some embodiments, a customer may be provided with information on how to reinstall any desired software if a problem arises.

Some embodiments may include verifying proper authentication and/or sign up. Such verification may be performed by any entity desired (e.g., a customer, a program, an agent of a gaming operator, a kiosk). Such verification may include comparing checksums and/or MD5 and/or SHA-2 hashes of files, program names, and so on. Such verification may include a verification by signing into an account and/or gaming service using the mobile device and/or performing any desired actions with the mobile device.

In some embodiments, after such a process (e.g., in response to successfully completing one or more actions of such a process), a customer may be and/or a device may be approved for gaming A customer, for example, may be able to access a wagering account and/or place wagers through a gaming service using an approved device (e.g., the device and/or any approved device).

In some embodiments, a customer may be associated with a device for use with a gaming service. For example, if a customer signs up with a device and the device is verified, the verified device, and the customer may be linked so that the customer may use the device with the gaming service. For example, a database entry identifying such a link may be made (e.g., a user name of the customer and/or mac address/phone number of the device may be identified as linked). In some embodiments, the customer may be prevented from using other devices with the service (e.g., unless the customer signs those devices up and becomes associated therewith as well). In some embodiments other customers may be prevented from using the device with the gaming service (e.g., unless the other customers become associated with the device).

In some embodiments, a player may be able to access an account and/or wager through a wagering service using any device that has been activated. For example, a user may sign on to a wagering service using an established username and/or password using any device that has been verified for use with a gamine service by the user and/or any other user. In some embodiments, separate databases of approved devices and approved users may be kept and any combination may be allowed to use a wagering service.

It should be recognized that such a process is given as a non-limiting example only and that other embodiments may include different, same, more, fewer, none, and so on such processes. Such processes may include same, different, alternative, fewer, more, differently ordered, and so on actions.

Security Handshake and/or Continuous Validation Examples

In some embodiments, an application security handshake may include a multisystem secure authentication protocol that may facilitate compliance with one or more regulatory requirements. For example, one or more actions and/or devices may provide reasonable assurances that a mobile device accessing a gaming service is at an approved gaming location at a time of a wager by utilizing a location service to retrieve the device's location (e.g., on a regular basis), validating a location of a device in response to one or more requests to a gaming service (e.g., every request). As another example, one or more actions and/or devices may provide reasonable assurances that a mobile device is being used in person and not being remotely controlled by, for example, validating on a polled interval that some (e.g., all except one) external interfaces to the device are disabled before allowing access to a gaming service. As another example, one or more actions and/or devices may provide reasonable assurances that a gaming application executed by a mobile device includes an authentic application by using a multi-stage hashing protocol to send application and OS signatures to the device authenticator service before allowing betting. As another example, one or more actions and/or devices may provide reasonable assurances that approved client versions are authorized to be used to place wagers by storing approved application hashing values on an internal database which is not accessible outside a firewall. As another example, one or more actions and/or devices may provide reasonable assurances that follow best practices regarding failed login attempts, session timeouts, etc. by defining session timeouts for each system connection the device is. As yet another example, communications may be secure by using SSL HTTPS protocol for communications that go over the Internet, and/or using application signature validation between processes on a device.

Some embodiments may include one or more actions that may be designed to provide some level of confidence regarding location, security, authenticity and/or any desired characteristics at a beginning of a gaming session, throughout a gaming session, and/or at points during a gaming session. In some embodiments, such actions may include a security handshake and/or a continuous validation process. A continuous validation process may include a process that periodically validates something, that occasionally validates something, that continuously validates something, that validates something at least one time after a handshake, that validates something upon an action, and so on.

Initial Validity with Service Provider Examples

Some embodiments may include an initial security process. Such an initial security process may be referred to as a handshake herein. In some embodiments, a handshake may include a multisystem secure authentication protocol. Such a process may provide reasonable assurances that the mobile device is in a location where gaming is permitted at and/or near the time of gaming Such a process may provide reasonable assurances that the mobile device is being used in person and not being remotely controlled at and/or near a time of gaming Such a process may provide reasonable assurances that software running on a mobile device includes an authentic application of a gaming operator. Such a process may provide reasonable assurances that that only approved client versions are authorized to be used to make wagers through a gaming service. Such a process may provide reasonable assurances that some and/or all external interfaces (e.g., Bluetooth, non-gaming operator provided Wifi, USB/DOCK) on the devices may be disabled to prevent remote connections. Such a process may use multilayer authentication. Such a process may include use of a soft tag and/or other location determination to locate the device. Such a process may be performed at a start of an application on a device, periodically by a device, upon installing of an application, in response to a bet being requested and/or placed, occasionally, continually, when a connection to a gaming operator is established, before a bet is placed, and/or whenever desired. For example, in some embodiments, an application may be programmed to perform at least a part of such a process when the application is started (e.g., selected to be executed on a mobile device). Examples of such processes given herein are non-limiting examples. Other embodiments may include no such process, a process with more, fewer, different, same, and/or differently ordered actions. One or more actions of such a process may be performed by a wrapper application, a main application, and/or any other component.

Some embodiments may include determining whether a device is approved for use with a gaming service. In some embodiments, determining that a device has been approved for use with a gaming service may include comparing information about the device with a listing of devices that have been approved (e.g., a database of approved phone numbers, mac addresses, etc.). In some embodiments, information identifying the device may be transmitted to a gaming service so that the gaming service may make such a comparison and/or determine in any desired way whether the device is approved. A gaming service may receive such identifying information and in response to such receipt, determine if the device is approved (e.g., if the device was previously registered, if the device information is in a database that identifies approved devices, etc.). In some embodiments, in response to a start of a gaming application, the gaming application may transmit a request to a gaming operator to verify that the device was previously approved for using the gaming service. In some embodiments, a wrapper application (e.g., an android wrapper application, a win32 wrapper application, a wrapper application that a main application communicates with, and so on) may transmit the request to a component of a gaming service (e.g., a device authenticator service). In some embodiments, the request may include a phone number, mac address and/or any other desired identifying information. In some embodiments, the component of the gaming service may receive the request, and in response to receiving the request verify that the device has been previously approved for gaming. In some embodiments, the component may transmit an indication of such verification to the mobile device. In some embodiments, a request from the mobile device may not be transmitted, but rather a communication from the mobile device may be interpreted as a request (e.g., an initial communication of a gaming session).

Some embodiments may include determining whether a device is/was located at a location where gaming is allowed.

In some embodiments, determining that a device is/was located at a location where gaming is allowed may include comparing information about where a device is/was located to a list of approved gaming locations. Some embodiments may include transmitting a request from a mobile device to a gaming service to verify that a location is approved. Such a request may include the request transmitted to verify that the device is approved for gaming. In some embodiments, a separate request may not be transmitted, but rather, a request for authentication may be interpreted as a request for location and/or a location may be verified without any request at all. In response to receiving such a request and/or determining that a location should be verified, a component of a gaming service may facilitate a determination of whether the location is approved. For example, a DAS may send a request to a mobile location service to track a device location. Examples of such device tracking and/or location determination are described elsewhere. Some embodiments may include determining that a device is/was an approved location. Such a determination may be sent back to the mobile device in some embodiments. Such a determination of a location may be made in response to receiving the determination that the device is authenticated.

Some embodiments may include determining that a user is approved to use a gaming service. In some embodiments, determining that a user is approved to use a gaming service may include requesting user information from the user and/or requesting verification of such user information. For example, a user may be prompted for a user name and password. Such user name and password may be authenticated by a gaming service. Such a determination may include determining that the user is approved to use a particular mobile device and/or the gaming service at large. Such a determination may be made in response to a user entering identification information, a determination that a device is approved, a determination that a device is in an approved location, and/or in response to any desired event.

Some embodiments may include determining that application software executed by a mobile device is approved for use with a gaming service. In some embodiments, determining that application software is approved for use with a gaming service may include verifying the application software verifying a version of the software, and/or verifying that the software is unmodified from an approved version.

One example method of determining that application software is approved may include a comparison of hashes and/or other characteristics of application software. For example, in some embodiments a wrapper application and/or other software component may determine an application signature hash (e.g., a hash of one or more application files and/or other files). In some embodiments, such a wrapper application and/or other software component may generate a random number. In some embodiments, such a wrapper application and/or other software component may determine a timestamp (e.g., the current time, a relatively recent time). In some embodiments, such a wrapper application may determine a hash, which may be referred to as the App Hash herein, of the timestamp, the random number, and the application signature hash. Some embodiments may include transmitting (e.g., by the wrapper and/or other software component) the timestamp, random number, and the App Hash to the gaming service (e.g., to a device authenticator service) from the mobile device. In some embodiments, a component of the gaming service (e.g., a device authenticator service) may validate that the timestamp is in a predetermined threshold of time (e.g., 5 minutes, 30 seconds, 1 hour) from another time (e.g., a current time, a time when information about the App Hash is received, a recent server time, and so on). In some embodiments, the gaming service component may validate the App Hash. Such validation may include creating a comparison hash of the received timestamp, the received random number, and an approved application signature hash. Multiple comparison hashes may be created for multiple approved applications. Such a validation may include comparing the App Hash with the comparison hash or hashes. If a comparison hash and the App Hash are equal, then the App Hash may be determined to be valid. If they are not equal, then the App Hash may be determined to be invalid. In some embodiments, a determination that the App Hash is valid may be a determination that the application software is approved for use with the gaming service. A determination that the App Hash is invalid may include a determination that the application software is not approved for use with the gaming service.

It should be recognized that such an example of hash comparison is given as a non-limiting example only. Other embodiments may include any desired method or no method of such validation. For example, checksums may be used, random numbers may not be used, time stamps may not be used, additional information may be used, and so on.

In some embodiments, in response to determining that the application software is approved for use with the gaming service, an indication of such approval may be transmitted to and/or received by the mobile device. In some embodiments, a gaming service component (e.g., device authenticator service) may determine a client key (e.g., a unique client key, a random number). Such a client key may be used for one or more future transactions. Such a client key may uniquely identify the mobile device and/or that the mobile device has passed one or more authentication steps. Such a client key may be transmitted to the mobile device in response to a determination that the application software is approved for use with the gaming service. Such a key may be stored in a database (e.g., a database that associated it with the mobile device).

Some embodiments may include determining that an operating system is approved for use with a gaming service. In some embodiments, determining that an operating system is approved for use with a gaming service may include verifying a version of an operating system, verifying that an operating system is unmodified, and/or any desired actions.

One example method of determining that the operating system is approved may include a comparison of hashes. For example, in some embodiments a wrapper application and/or other software component may determine a hash of one or more operating system files and/or components and the client key. The wrapper application and/or software component may transmit the hash, the previously determined timestamp, the previously determined random number, the client key, and device identifying information (e.g., a phone number, mac address) to a component of the gaming service (e.g., a device authenticator service). In some embodiments, a component of the gaming service (e.g., a device authenticator service) may validate that the timestamp is in a predetermined threshold of time (e.g., 5 minutes, 30 seconds, 1 hour) from another time (e.g., a current time, a time when information about the App Hash is received, a recent server time, and so on). In some embodiments, a component of the gaming service (e.g., a device authenticator service) may validate that the client key is the most recent one sent to the mobile device identified by the identifying information (e.g., by comparing the client key with a client key stored in a database keyed by the identifying information). In some embodiments, a component of the gaming service (e.g., a device authenticator service) may validate that the received hash. Such validation may include creating a comparison hash of the client key and approved operating system files and/or components. Multiple comparison hashes may be created for multiple approved operating systems. Such a validation may include comparing the received hash with the comparison hash or hashes. If a comparison hash and the received hash are equal, then the comparison hash may be determined to be valid. If they are not equal, then the comparison hash may be determined to be invalid. In some embodiments, a determination that the received hash is valid may be a determination that the operating system is approved for use with the gaming service. A determination that the received has his invalid may be a determination that the operating system is not approved for use with the gaming service.

It should be recognized that such an example of hash comparison is given as a non-limiting example only. Other embodiments may include any desired method or no method of such validation. For example, checksums may be used, random numbers may not be used, time stamps may not be used, device information may not be used, client keys may not be used, device information may be obtained from another source, additional information may be used, and so on.

Some embodiments may include transmitting information from a component of a gaming service to a mobile device in response to a completion of such a process, to complete such a process, as part of such a process, in response to verifying the operating system, in response to another action of such a process, and so on. Some embodiments may include storing information identifying that such a process has succeeded. For example, some embodiments may include determining a device session identifier. Such an identifier may include a unique identifier that may be used to identify a gaming session between the gaming service and the mobile device. Such a device session identifier may be associated with the mobile device (e.g., stored in a database). Such a device session identifier may be time stamped (e.g., with the previously determined time stamp, with a time relative to the determination of the device session identifier, and so on). Such a device session identifier may include a random number. Such a device session identifier may be transmitted to a mobile device and/or stored in a location to identify a success of such a process. Such a device session identifier may be received by a wrapper application and/or other software component. Such a device session identifier may be stored by the mobile device (e.g., in an encrypted form, in local storage, in memory, in a location reserved for the mobile gaming application and/or a component thereof, in a location reserved for the wrapper application and/or other software component, in allocation only accessible by a desired application, and so on). Such a device session identifier may be transmitted with future requests from the device to identify that a process has completed successfully. When a future request is received by a component of a gaming service, a comparison of a received device session identifier may be made to ensure that a valid device session identifier is received with the request. Accordingly, such a check may ensure that only devices that have completed such a process can access a gaming service.

In some embodiments, if a part of this process fails, the phone may be considered unauthorized by the server and requests (e.g., gaming related communications) may be refused. It should be recognized that such an example process is given as a non-limiting example only. Other embodiments may include differently ordered actions, different components, no actions, more actions, fewer actions, and so on. Any action may be taken in response to any other action being successful (e.g., a determination of application software being valid may cause a determination as to whether or not operating system software is valid to occur).

Device and/or User Security

In some embodiments, at least a part of such an initial validity and/or handshake may be performed by a wrapper application. If such an initial process is completed successfully, a main application may be executed (e.g., by the wrapper application). Such a main application may perform a device and/or user security process. In other embodiments, a wrapper application may perform any desired other actions (e.g., a below process), a single application may be used, any arrangement of programs may be used, and so on.

Some embodiments may include a process for providing a level of assurance as to a device and/or user security. In some embodiments, such a process may be performed at a start of a gaming application, throughout an execution of a gaming application, in response to a logging into a gaming service, in response to a completion of an initial handshake and/or other initial process, parallel to an initial handshake and/or initial process, before an initial handshake and/or initial process, as part of an initial handshake and/or initial process, and/or as otherwise desired. Such a device security process may include determining that a device is locally used and/or preventing a device from being remotely accessed.

Some embodiments may include establishing a connection between a main gaming application and a wrapper application. Such a connection may include a socket. Such a connection may include a shared memory space. Some embodiments may include a wrapper application opening a socket. Such a socket may only be accessible by software executed on the mobile device. In some embodiments, a main application may connect to the socket and/or memory space. The socket and/or memory space may be used for communication between the applications.

Some embodiments may include verifying that a connection between applications and/or shared identifiers are valid. For example, in an Android environment, a lock file may be written to a data store of a first application (e.g., a wrapper application). An Android operating system may prevent a second application (e.g., a main application) running on the mobile device from accessing the first application unless the application have been signed by a same application signature. A second application may attempt to delete the lock file form the first application's data store. In some embodiments, if the applications properly share the same signature, the deletion may occur. The first application may verify that the deletion has occurred. If the deletion has occurred, the first application may be confident that the second application shares a valid signature with the first application. As another example, some embodiments may verify that the only two applications running under a particular user identifier are the two applications and/or other gaming applications that are approved. In some embodiments a verification that the two and/or more applications are running under a same user identifier. The first application may share a device session identifier with the second application in response to one or more such determinations.

Some embodiments may include determining that a user is authorized to use a gaming service. For example, some embodiments may include soliciting user information. Such a solicitation may be performed by a gaming application (e.g., a wrapper application, a main application, etc.) running on a mobile device. For example, a user may be solicited for a username and password. A user name and password may be received by a gaming application in response to a user entering such information into a mobile device. Some embodiments may include transmitting such information from a gaming application to a component of a gaming service. For example, in some embodiments, such information may be transmitted to a gateway device. In some embodiments, an account information (e.g., account number, username, password, pin, etc.) may be transmitted to such a gateway and/or other device. In some embodiments, such a transmission may include a transmission of a device session identifier and/or any other information that may be used to identify a device, a session, a previously authentication of information, and/or track any desired information. Various actions may be performed by a gaming application (e.g., a wrapper application, a main application, etc.) running on a mobile device.

In some embodiments, a gateway and/or other component of a gaming service (e.g., middleware, servers, etc.) may enable a communication session (e.g., HTTP session, HTIP session) for a mobile device. The gateway and/or other component may associate a device identifier with a communication session. For example, such a communication session may only be usable when it is accessed using the device identifier unless a different or other identifier is associated with the session. In some embodiments, a communication session may be defined by one or more variables (e.g., a port number, an id number). Such variables may be shared with a mobile device and future communications may include such variables.

Some embodiments may include determining that a mobile device is/was at a location that is approved for gaming Such a determination may be made in response to receiving account information from a mobile device by a gaming service. In some embodiments, a device session identifier may be transmitted from a gateway and/or other component to a different component for verification (e.g., to a device authenticator service). Such a device authenticator service may verify the device session identifier and determine if the device session identifier is associated with an approved location. If the device session identifier is associated with an approved location, the device authenticator service may transit an indication of approval to the gateway. In some embodiments, a single device may perform such approval actions. It should be recognized that such a process of determining whether a device is/was at an approved location is given as an example only. For example, in some embodiments a device itself may determine whether it is in an approved location, a gateway and/or other component may determine whether the device is in an approved location, any device may determine whether the device is in an approved location, a current location may be determined, an old location may be used, and so on. Various examples of determining locations and/or storing location information are given herein. None of such examples are limiting.

In some embodiments, a gaming service may validate user information. Such a validation may occur in response to receiving the user information, in response to determining that the device is/was in an approved location, in response to another event, and so on. For example, in some embodiments, a gateway and/or other component may transmit user account information to another component of a gaming service (e.g., device authenticator service, mobile gaming service, etc.). Such another component may validate the account information (e.g., determine that username and password are accurate, compare information to information in a database, etc.).

In some embodiments, if the information is validated, such a component may transmit an indication of such validation to a gateway and/or other component. Such an indication may include a wagering session identifier. A wagering session identifier may be determined in response to a determination that the information is valid. Such a wagering session identifier may include a unique identifier. Such a wagering session identifier may include a random number. A gateway and/or other component may receive such an identifier. Such a gateway and/or other component may associate such an identifier with a communication session for the mobile device (e.g., further communication may require such a identifier unless it is changed). In some embodiments, a mobile device (e.g., a main application and/or wrapper application) may be notified of such an identifier and/or a success of an authentication of a user. Such a mobile device application may store such an identifier for use in future communication. Future requests from a mobile device may include such an identifier.

In some embodiments, such validation may occur only if the device is/was at an approved location. If the device does not pass a location check, the device may be prevented from gaming and such a login may not be performed. In other embodiments, such a login may continue regardless of the location of the device. In some embodiments some features of a gaming service may be disabled if the location check does not pass.

It should be recognized that while some embodiments have been described as having separate processes (e.g., an initial handshake and/or a user/device security process) and/or separate applications (e.g., a wrapper application and a main application) that various embodiments may include a single process and/or a single applications, multiple processes, and/or applications, differently ordered and/or interacting applications and/or processes, and so on.

In some embodiments, after such an initial handshake process and/or a device and/or user security process, one or more variables may be defined. For example in the example methods, a wagering session identifier and/or communication session may be defined by the user and/or device security process, and/or a device session identifier may be defined by an initial handshake process. Such variables may be checked, updated, changed, tracked, and so on. Such variables may be required for further communication from the mobile device to be allowed to access gaming services. For example, if communication is received by the gaming service without such variables being valid, the communication may be ignored and/or not allowed to form a wager. Such variables are given as non-limiting examples only. Other embodiments may include different variables, additional variables, no variables, different applications, and so on as desired.

It should be recognized that various security processes and/or applications are given as non-limiting examples only. Other embodiments may include any and/or no processes in any order, with any actions, and so on. Such processes may include additional, fewer, different, same, differently ordered, and so on actions.

On Going Validity Examples

Some embodiments may include one or more actions related to maintaining security, maintaining location information, and/or creating some level of assurances that some requirements are met. For example, some embodiments may include continuous, periodic, occasional, randomly, on demand, in response to action, and/or other actions. Such actions may include location checks, device checks, user checks, and so on.

Variable Maintenance Examples

In some embodiments, such actions may include maintaining one or more variables, expiring one or more variables, redefining one or more variables, and so on. Some embodiments may include actions related to variables defined in other security processes, such as those discussed above. For example, a device session identifier, a gaming session identifier, and a communication session may be used in some embodiments. Such variables may have limited valid lifetimes, may be redefined periodically, may expire after some time, may be required to occasionally redefined, and so on. For example, in some embodiments, a device session identifier may be valid for about 30 seconds, about 3 minutes, about 5 minutes, about 10 minutes, about 1 hour, and/or any desired time. As another example, a gaming session identifier may be valid for about 30 seconds, about 3 minutes, about 5 minutes, about 10 minutes, about 1 hour, and/or any desired time. As yet another example, a communication session may be valid for about 30 seconds, about 3 minutes, about 5 minutes, about 10 minutes, about 1 hour, and/or any desired time. New variables may be defined in a similar fashion to their original definitions (e.g., by a device authenticator service, by a mobile gaming service, by a gateway, by a server, by another component, using hash values, using checksums, using random numbers, using timestamps, and so on).

Various examples of defining such variables are given elsewhere, but it should be recognized that such examples are non-limiting and that similar, different, same, alternative, and so on methods may be used to redefine and/or define any same and/or different variables as desired. It should be recognized that variables, and time frame for validity are given as non-limiting examples only and that other methods may include no, other, same, different, and so on variables; no, different, same, and so on methods of maintaining security and/or other characteristics, my use different time frames, my use random time frames, may randomly require redefinition, may require definition upon and event (e.g., a wager request), and so on.

Characteristic Examples

In some embodiments, one or more actions may be related to validating one or more characteristics of a device and/or user of a device. Some embodiments may include actions related to such characteristics (e.g., location, user identity, lack of external control of device, etc.). For example, in some embodiments, a disabling of external access to a mobile device may be validated, a location of a device at an approved gaming location may be validated, a user identify information may be validated, one or more variables being valid may be determined, and so on. In some embodiments, such validation may occur periodically, randomly, on demand, in response to an action, as desired, and so on.

For example, some embodiments may include validating that some and/or all external communication (e.g., except communication used to access a gaming service such as a mobile phone network) are disabled. Some embodiments may include a gaming application executed by a mobile device querying an operating system of a mobile device. For example, a main application may transmit a query to a wrapper application. The wrapper application may query the operating system. In some embodiments, in response to such a query, the operating system may determine if any invalid interfaces are enabled and return such information to the wrapper application and/or main application. In response to such information the validation may fail (e.g., if unapproved interfaces are enables) and/or succeed (e.g., if no unapproved interfaces are enabled). Some examples of interfaces that may not be approved may include Bluetooth, Wi-Fi, docking port, and/or other interfaces. Such a validating may occur continuously, periodically (e.g., every 5 seconds, every 15 seconds, every minute, every 5 minutes, every hour, etc.), randomly, on demand, and so on.

As another example, some embodiments may include validating that a mobile device is/was at a location that is associated with allowed gaming Some embodiments may include a component of a gaming system making such a check independent of actions on the mobile device. Some embodiments may include the mobile device checking such a status (e.g., by querying a gaming system and/or other location system). In some embodiments, a component of a gaming system (e.g., a device authenticator service) may run checks on the location of the mobile device. Such a component may update a database with the check results, may enable or disable communication with a mobile device, features of a gaming service in response to such results, may notify a mobile device (e.g., to disable a feature of the device and/or display in indicator) and/or user in response to such results. Such a check may be performed continuously, periodically (e.g., every 30 seconds, every 5 minutes, every 10 minutes, every 15 minutes, every hour, etc.), on demand, in response to an event, and so on. In some embodiments, such location checks may be made more frequent when a mobile device is near an edge of an approved area than when the device is far from an edge of an approved area. For example, in some embodiments, a check may be performed every 5 minutes if a device in a previous check was near a border of a state, every 10 minutes if a device was near an edge of an approved area but far from an edge of a state, and every 15 minutes if a device was not near a border of a state or a border of an approved area. Various examples of location determination are given elsewhere herein. It should be recognized that examples of location checking are given as non-limiting examples only and that other embodiments may include no, different, same, and so on methods.

As yet another example, some embodiments may include determining whether user information is valid and/or whether a session or another variable is valid. For example, some embodiments may include transmitting a request from a mobile device to a component of a gaming service (e.g., a gateway). Such a request may include user information for validation, and or a request to verify that some variable is valid. For example, a request may request that the gateway verify that a device authorization session is valid. Such request may be processed (e.g., by a device authenticator service) and a response may be transmitted to the mobile device. Such a check may be performed continuously, periodically (e.g., every 30 seconds, every 5 minutes, every 10 minutes, every 15 minutes, every hour, etc.), on demand, in response to an event, and so on.

Various examples of characteristics and methods validation should be recognized as non-limiting. Other embodiments may include no, similar, different, same, alternative, and so on methods and/or characteristics.

Event Examples

In some embodiments, one or more actions may be related to validating one or more characteristics of a device, user, and/or variable in response to an event. For example, in some embodiments, when a communication is received from a mobile device, a gaming service may perform such one or more actions. In some embodiments, such communication may include a request to place a wager, a request to view available wagers, a request to view an account, and so on. For example, in some embodiments, in response to a request being made to and/or through a gateway and/or other component of a gaming service (e.g., after initial login) one or more actions may be taken.

Some embodiments may include transmitting a request from a mobile device to a gaming service. For example, a wrapper application and/or main application may transmit a request to a gateway, and/or other component of a gaming service. Such a request may identify any desired variables (e.g., a communication session, a device session identifier, a gaming session identifier, a client key, and so on). Such a request may include a request to take a gaming related action, such a request may include a polling of a gaming service to determine current information (e.g., current games, current scores, account history, current account values, etc.). Some embodiments may include periodic, random, constant, etc. polling. In some embodiments, such polling may not initiate such validation actions.

Some embodiments may include receiving such a request by a component of a gaming service. For example, such a request may be received by a gateway and/or other component of a gaming service. In some embodiments a determination may be made that such a request triggers one or more validation actions (e.g., all request may trigger such actions, every X request may trigger such actions, randomly some requests may triggers such actions, certain types of requests may triggers such actions, a determination may be made the request is not a polling request, a determination may be made that the request is a request to place a wager, a request every Y minutes may trigger such actions, etc.).

A gateway or other device may perform any desired actions in response to receiving such a request and/or determining that such actions should be performed. For example, in some embodiments, a gateway or other component may determine that a communication session identified by a request is properly associated with the device from which it is received (e.g., by querying a database).

As another example, in some embodiments (e.g., if the communication session check passes) a gateway and/or other component may validate a device session and/or location information. For example, in some embodiments, a gateway and/or other component may transmit a request for validation of a device session and/or location to a device authenticator service. A database of information may be queried to determine if one or more variables are valid (e.g., if a device session identifier associated with the device is valid, have not expired). A database of information may be queried to determine if a mobile device was last determined to be at a location where gaming is allowed. In some embodiments, a new location of the device may be determined. If such checks pass, a timestamp of a last valid check may be updated. Such information may be returned to a gateway and/or other component. It should be recognized that such examples of validation are given as examples only and that other methods may include different components, characteristics, and/or actions.

As yet another example, in some embodiments, if a validation is made of one or more characteristics from a device authenticator, a gateway and/or other component may validate any desired characteristic and/or variable with any components. For example, a gaming session identifier may be validated with a component of a gaming service. Such a component (e.g., server, account based wagering service) may query a database to determine if a gaming session identifier is valid (e.g., correct, not expired). A timestamp of a last check may be updated, and a gateway and/or other component may be notified of a success or failure to validate the information.

In some embodiments, in response to a validation action taken in response to a received request, a request may be processed and/or information may be updated. For example, one or more timestamps of last actions may be updated, one or more wagers may be placed, one or more account transactions may be performed, requested information may be obtained, actions in a game may be taken (e.g., a hit in a blackjack game), and so on. Some embodiment may include returning a result to a mobile device (e.g., transmitting). Some embodiments may include presenting such a result to a user.

Various examples of characteristics and methods validation should be recognized as non-limiting. Other embodiments may include no, similar, different, same, alternative, and so on methods and/or characteristics.

In some embodiments, if one or more validation actions of any described method or other methods fails (e.g., if a variable is determined to be incorrect or expired, if a device is determined to be allowing external control, if a password is incorrect, if a location is not proper, etc.), one or more actions may be prevented and/or taken. For example, in some embodiments, a communication with a device may be prevented, wagering actions may be prevented, access to a gaming service may be halted, a user may be notified of an error, and so on.

Figure 3:
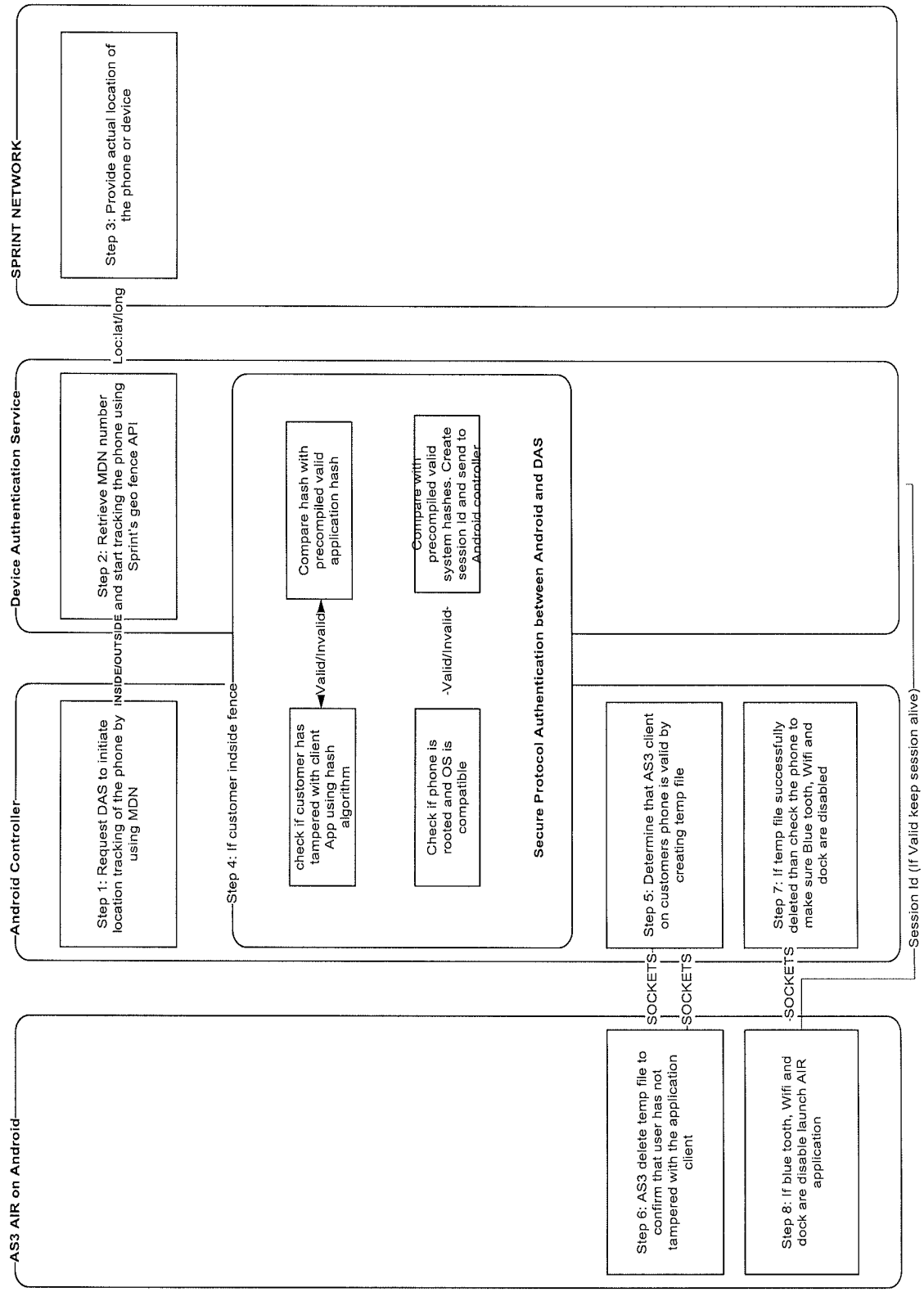
FIG. 3 shows an example process that may be used in some embodiments for validation and/or use of a mobile device.

FIG. 3 illustrates an example process that may be used in some embodiments for validation and/or use of a mobile device. Such a process may include actions performed by a mobile device, actions performed by a gaming application (e.g., a main application, a wrapper application, and so on), actions performed by a component of a gaming service and/or agent of a gaming service (e.g., a device authenticator service, a communication provider, a location service, and so on) and/or actions performed as desired by any entity. For example, some embodiments may include requesting an initiation of a location tracking of a mobile device, tracking a mobile device, providing location information about a mobile device, determining if a customer has tampered with a client and/or operating system, determining whether one or more communication interfaces are enabled and/or active, and so on. It should be recognized that such actions are given as non-limiting examples and that other embodiments may include performing any actions in any order as desired.

Figure 4:
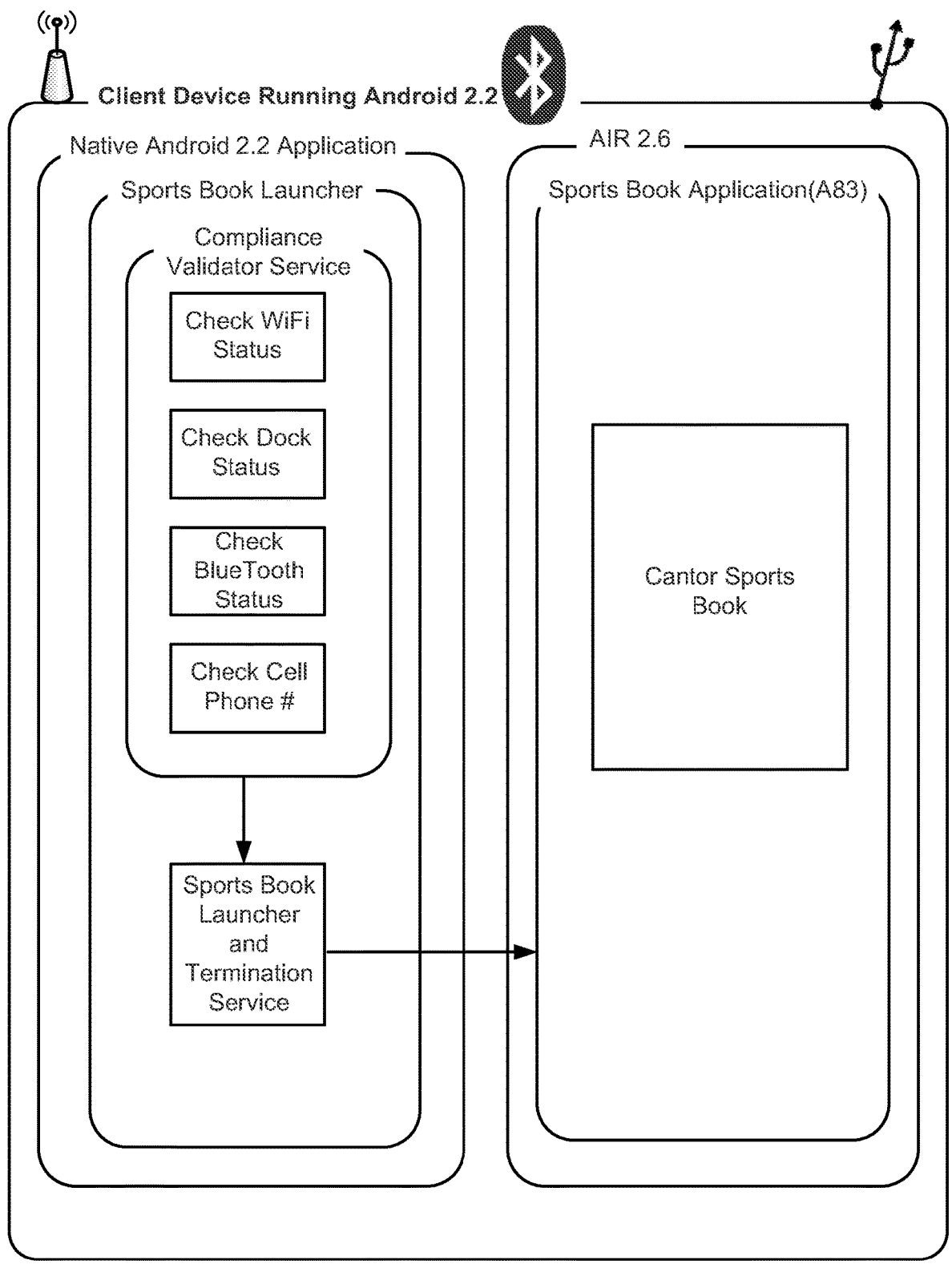
FIG. 4 an example set of application that may be executed by a mobile device to facilitate access to a mobile gaming service.

FIG. 4 illustrates an example set of application that may be executed by a mobile device to facilitate access to a mobile gaming service. Such applications may include a wrapper application and a main application. A wrapper application may initiate execution of a main application and perform one or more security checks. A main application may perform wagering actions in connection with a gaming service. It should be recognized that this example process and applications are given as non-limiting examples only. Other embodiments may include different, same, additional, alternative, differently orders, and so on acts performed by same and/or different entities and/or devices as desired.

Location Examples

Some embodiment may include one or more location determination features and/or features that may be affected by a location of a mobile device. Such features may include determining an actual location, determining a relative location, determining whether a location is a valid location, disabling a feature based on a location, enabling a feature based on a location, adjusting a feature based on a location, and so on.

Geofencing Examples

One example location feature may include a geofencing service. Geofencing capability may be used to help ensure that a customer is/was at an approved area (e.g., when a location check is performed, when a wager request is received by a gateway, etc.). One example of a geofencing technology provider includes Sprint. In some embodiments, such geofencing technology may be used to determine whether a customer is/was at the city of Las Vegas, Reno, Tahoe and/or other gaming locations in the state of Nevada that are geofenced. In some embodiments, customers may place sports and/or casino wagers if they (e.g., the device they are using) are/were physically in the boundaries of an approved geofence. In some embodiments customers may not place sports wagers if they are/were not in the boundaries.

A geofence may include a virtual perimeter of a real-world geographic area. Some example of parameters that may define a geofence around a major city like Las Vegas, Reno, etc. may include: latitude 89.2 deg., longitude 33.4 deg., radius 20 miles; and latitude 50.5 deg., longitude 76.9 deg., radius 22 miles.

It should be recognized that any number of geofences in any location with any parameters may be used as desired. Geofences may be added and/or removed at any time desired to increase, decrease, and/or change an area in which wagering is allow and/or not allow. For example, another set of example geofences may include: longitude 36° 05' 58.37"N, latitude 115° 12' 04.90"W, radius 20 miles; longitude 39° 38'58.68"N, latitude 119° 34' 40.66"W, radius 20 miles; and longitude 39° 05' 08.69"N, latitude 119° 34' 10.61"W, radius 20 miles.

Figure 5:
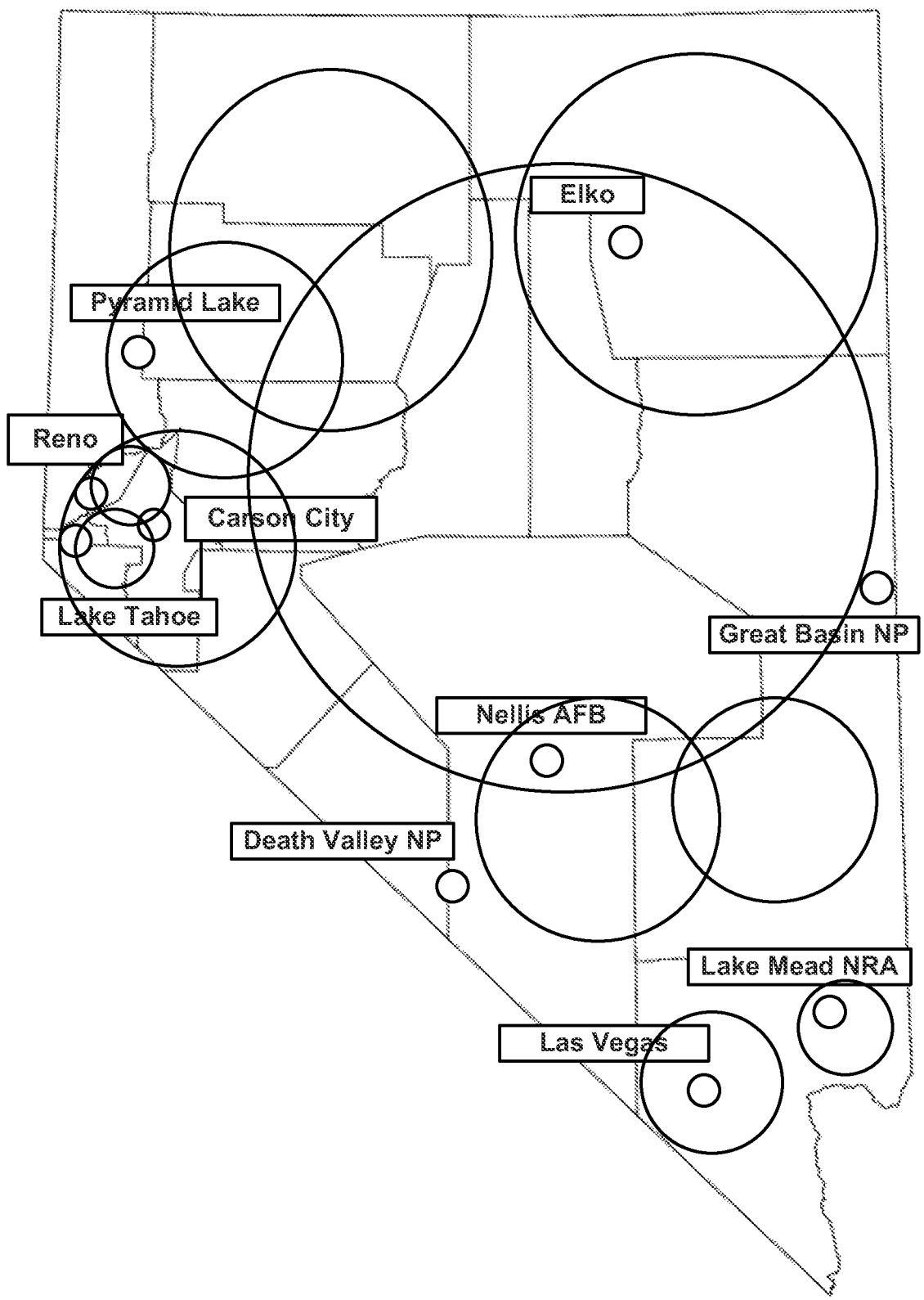
FIG. 5 shows an example of a series of geofences shown on a map of Nevada. The circles/discs in the map represent sample geofences.

FIG. 5 illustrates an example of a series of geofences shown on a map of Nevada. The circles/discs in the map represent sample geofences. A gaming service may provide reasonable assurances that the customer is wagering in an approved area by using the capabilities that these geofences provide. In some embodiments, customers may be able to place sports wagers if and only if they are physically inside a geofence, if an only if a last updated location (e.g., by a device authenticator service) shows that the device was last at an approved location, and so on. In some embodiments, customers cannot place sports wagers if they are physically outside a geofence and/or were last determined to physically be outside of a geofence. It should be recognized that while examples are given in terms of circles that any desired geofence shape may be used (e.g., a geofence around a casino).

Some embodiments may include determining whether a device is in or out of one or more geofences. Such determination may include, for example, a determination by a geofencing provider (e.g., based on gps coordinates of the device and the geofence(s), based on triangulation through communication devices (e.g., cell towers), and so on). In some embodiments, such a determination may include a determination by a component of a gaming service (e.g., by querying a location service provider, by calculating a location, by receiving an indication, and so on). Geofencing may include Telematics hardware and/or software.

In some embodiments, when a device (e.g., a mobile device using a gaming service, a location aware device, a device of a location-based service, etc.) enters or exits a geofence, the device and/or a component of a gaming service (e.g., a device authenticator service) may receive a generated notification (e.g., a provider of location services may transmit a notice to a device indicating such a change in location). This notification might contain information about the location of the device (e.g., a current gps coordinates, a name of a geofence, a city, an indication that the device is in or out of a geofence, etc.). Such a notification may be transmitted to a mobile device over a communication network, to a component of a gaming service over a communication network, to an email account, as a text message (e.g., SMS), and so on.

Some embodiments may include taking any desired action in response to a crossing and/or near crossing of a geofence border. For example, in response to a leaving and/or near leaving of a geofenced area, a vehicle may be stopped, a third party may be notified, a gaming service may be notified, a game may be stopped, a mobile device may be affected (e.g., shut down, an application may be halted, and so on), and so on. Such actions may be facilitated by a gaming service provider in response to determining such a change to a location and/or a location service provider.

As yet another example of a working of a location service, some embodiments may include a location service that may be queried as desired to determine a location. For example, a communication service provider (e.g., Sprint) may track a current location of a mobile device using a communication service (e.g., through gps coordinates, through cell towers or other communication access points being accessed, etc.). Such tracking may be performed continually and/or in response to a request.

In some embodiments, a gaming service may transmit a query to verify a location as desired. For example, a gaming service may transmit a query to a location service whenever a variable has expired, periodically, in response to a query, etc. In some embodiments, such a query may ask the location service if a mobile device is in a boundary of one or more geofences. In some embodiments, such a query may ask the location service for allocation of a mobile device and a gaming service may determine if the mobile device is in the one or more geofences by comparing the location to the geofences.

In some embodiments, a gaming service may desire to minimize determinations and/or queries regarding locations. For example, such determinations may require processing time that is desired for other processes, and/or a location service may charge a fee for responding to such queries. Some embodiments may include a variable frequency and/or need for such queries and/or determinations. Some embodiments may include determining when to make a determination of a location based on a distance from boundary (e.g., a boundary of a geofence, a boundary of an allowed gaming area) of a prior location determination.

For example, in some embodiments, a time between determinations (e.g., periodic determinations, random determinations, occasional determinations, and so on) of a location (e.g., a frequency of a query) may be greater if a device is farther from a boundary of a geofence than if the device is closer to a boundary of the geofence. For example, a location variable may remain valid for longer if it is based on the location that is farther from the boundary. In some embodiments, a response to a query may indicate when a next query should be made based on such a distance. In some embodiments, a response to a query may indicate a distance from a boundary (e.g., an actual distance, a category of distance, and so on). A gaming service may determine when to make a next query based on such received information. Such querying may include for example, querying every 5 seconds for close to a boundary, every 15 second for far from a boundary, a sliding scale, and so on. In some embodiments, a query may be made for every transaction when close to a boundary, every other transaction when far from the boundary, and so on. A determination may be made that a request from a mobile device does not require a location determination based on a distance from a boundary.

Some embodiments may include concentric geofences that may be used to determine when a query of a location is to be made. For example, an inner geofence may correspond to a location far from an allowed boundary and may correspond to a longer time frame. An outer geofence may correspond to an actual and/or closer boundary of an approved area and may include a more frequent determination. Some embodiments may include determining whether a determination of a location of a mobile device should be made based on the mobile device being outside of at least one geofence and inside of at least one other geofence.

It should be recognized that such examples of a determination rate being related to a distance form an edge of an approved area are given as non-limiting and that other embodiments may include any methods and/or apparatus that may in any way relate determinations to distance may be used as desired.

Some embodiments may include determining such a determination rate based on a speed of a mobile device. For example, in some embodiments, a speed of a mobile device may be determined based on a current and prior location (e.g., the distance traveled between determinations divided by the time between determinations). In some embodiments, a faster traveling device may be associated with a faster rate and a slower speed may be associated with a slower rate.

In some embodiments, a speed and distance may be used to determine such a determination rate. For example, determination rate may be determined such that at a determined speed, a device is unable to travel a distance to a boundary in a determined time, is unable to travel half a distance to the boundary, is unable to travel any threshold percentage of a distance to a boundary, and so on.

In some embodiments, a direction may be used to determine such a determination rate. For example, a direction may be determined based on prior two locations (e.g., traveling in the direction of the second location from the first location). In some embodiments, a distance to the boundary that may be used in determining a time period may be based on a distance to the boundary in the direction of travel, a shortest distance to the boundary in a range around the direction of travel (e.g., 20 degrees in either direction from the direction of travel, 90 degrees in either direction form the direction of travel, and so on).

In some embodiments, a maximum time period may not be exceed (e.g., 1 minute, 5 seconds, 1 hour, 10 minutes, etc.).

It should be recognized that any actions, processes, information, and so on may be used to determine a determination period as desired in any combination with any desired restrains.

Various other services may be offered by a location providing service. For example, Geofencing may be used with child location services to notify parents when a child leaves a designated area. A location-based service may include an information and/or entertainment service, such as a mobile gaming service that may be accessible with mobile devices through a mobile network. Such a service may make use of the geographical position of a mobile device. LBS services can be used in a variety of contexts, such as health, work, personal life, etc. LBS services may include services to identify a location of a person or object, such as discovering the nearest banking cash machine or the whereabouts of a friend or employee. LBS services may include parcel tracking and vehicle tracking services. LBS can include mobile commerce when taking the form of coupons or advertising directed at customers based on their current location. They may include personalized weather services and even location-based games.

In some embodiments, technology may allow the creation of standalone and/or overlapping geofences. Technology may allow creation of a geofence/circle of any given radius and/or shape. In some embodiments, this technology may prevent anyone outside of a fence from placing wagers. Geofencing may allow users of a system to draw zones around places of work, customer's sites and/or secure areas.

As an example, some embodiments may use a sandbox service for geofencing provided by Sprint. Such a service is given as a non-limiting example only. This service may include one or more geographical locations where each single position can be plotted with a geographic coordinate. A user may be able to build a perimeter around this location—a fence, based on those coordinates. Users of such a system may have the ability to build fences, add devices related to those fences and be notified when a device is entering or leaving (or both). In some embodiments, to alleviate privacy concerns, only devices having explicitly granted access to an application may be able to interact with a geofence.

In some embodiments, one or more services may be available as part of a geofencing API to facilitate generating, eliminating, maintaining, querying, connecting, and so on regarding geofences. One or more of the following examples of services may be available and/or used to provide wagering services:

List—This service is used to return geofences associated with a user.
list.{format}
http://sprintdevelopersandbox.com/developerSandbox/resources/v1/geofence/list.{format}?{params}
Authentication
This method requires a generated MD5 signature.
Arguments
key—Your API Key.
timestamp—The current time of the request: [YYYY]-[MM]-[DD]T[HH]:[MM]:[SS][ZZZ][HH] refers to a zero-padded hour between 00 and 23 (where 00 is used to notate midnight at the start of a calendar day).
sig—The MD5 Digest value of the parameters of the geofence service and your secret.
Http Method
Get
Response
fenceId—ID of the fence associated with the user.
status—Whether or not the fence is currently active (monitoring) or inactive (not monitoring).
startEndTime—The times between which the fence monitors (if active), i.e. 915-1430, times are military.
days—Days the fence monitors (if active), note: H=Thurs, A=Sat.
lastMonitor—Date\Time of the last check on this fence.
Latitude—Center latitude on which the fence is based.
longitude—Center longitude on which the fence is based.
dimensions—Dimensions of the fence (currently "radius" is v1 of geofence).
Example Request
Get
http://sprintdevelopersandbox.com/developerSandbox/resources/v1/geofence/list?key=123abckey×tamp=2010-03-05T10:12:00CST&sig=123abcdef456
Example Response
110(Inactive, 900-1700, MTWHF, NEVER, 38.9178, −94.6598, 50), 427(Active, 930-1115, SA, NEVER, 38.9178, −94.6598, 500)
Add—This service is used to add a fence.
add.{format}
http://sprintdevelopersandbox.com/developerSandbox/resources/v1/geofence/add.{format}?{params}
Authentication
This method requires a generated MD5 signature.
Arguments
Key—Your API Key, click here to view.
Name—The name of the fence.
strtTime—Earliest time to start monitoring the fence, format [HH][MM]
note: [HH] refers to a zero-padded hour between 00 and 23 (where 00 is used to notate midnight at the start of a calendar day).
endTime—Latest time to monitor the fence, format [HH][MM]
note: [HH] refers to a zero-padded hour between 00 and 23 (where 00 is used to notate midnight at the start of a calendar day).
Lat—Center latitude on which to base the fence.
Long—Center longitude on which to base the fence.
Dim—Dimensions of the fence (for v1 of geofence, this is the radius).
Interval—The interval at which the fence should be checked;
note: only increments of 5 min may be allowed; i.e. 5, 15, 25, etc.
days—Days on which the fence should be monitored, as a String with a single representing each day
note: H=Thurs, A=Sat; i.e. SMTWHFA.
notifyEvent—Whether the fence should notify on "in", "out" or "both" (excluding this param will default to "both").
Timestamp—The current time of the request: [YYYY]-[MM]-[DD]T[HH]:[MM]:[SS][ZZZ]
note: [HH] refers to a zero-padded hour between 00 and 23 (where 00 is used to notate midnight at the start of a calendar day).
Sig—The MD5 Digest value of the parameters of the geofence service and your secret.
Http Method
Get
Response:
message Success message if recipient was added or an error message.
Example Request:
Get
http://sprintdevelopersandbox.com/developerSandbox/resources/v1/geofence/add?key=123abckey&name=My%20Fence&strtTime=900&endTime=1700&lat=38.917806&long=94.659787&dim=50&interval=1  5&days=MTWHF×tamp=2010-03-05T10:12:00CST&sig=123abcdef456

Example Response
　　FENCE_ADDED
Activate—This service is used to activate an existing fence.
activate.{format}
http://sprintdevelopersandbox.com/developerSandbox/resources/v1/geofence/activate.{format}?{params}
Authentication
　　This method requires a generated MD5 signature.
Arguments
　　Key—Your API Key, click here to view.
　　fenceId—The ID of the fence to activate.
Timestamp—The current time of the request: [YYYY]-[MM]-[DD]T[HH]:[MM]:[SS] [ZZZ][HH] refers to a zero-padded hour between 00 and 23 (where 00 is used to notate midnight at the start of a calendar day).
Sig—The MD5 Digest value of the parameters of the geofence service and your secret.
Http Method
　　Get
Response
　　message: Success message if fence was activated or an error message.
Example Request
　　Get
http://sprintdevelopersandbox.com/developerSandbox/resources/v1/geofence/activate?key=123abckey&fenceId=110×tamp=2010-03-05T10:12:00CST&sig=123abcdef456
Example Response
　　FENCE_ACTIVATED
Deactivate—This service is used to deactivate an existing fence.
deactivate.{format}
http://sprintdevelopersandbox.com/developerSandbox/resources/v1/geofence/deactivate.{format}?{param s}
Authentication
　　This method requires a generated MD5 signature.
Arguments
　　Key—Your API Key, click here to view.
　　fenceId—The ID of the fence to activate.
Timestamp—The current time of the request: [YYYY]-[MM]-[DD]T[HH]:[MM]:[SS] [ZZZ][HH] refers to a zero-padded hour between 00 and 23 (where 00 is used to notate midnight at the start of a calendar day).
Sig—The MD5 Digest value of the parameters of the geofence service and your secret.
Http Method
　　Get
Response
　　message Success message if fence was deactivated or an error message.
Example Request
　　Get:
http://sprintdevelopersandbox.com/developerSandbox/resources/v1/geofence/deactivate?key=123abckey&fenceId=110×tamp=2010-03-05T10:12:00CST&sig=123abcdef456
Example Response
　　FENCE_DEACTIVATED
Some services may be used to maintain devices being tracked in relation to a specific geofence. For example, the following services may be used and/or offered for such purposes in some embodiments:
List—This service is used to return all devices associated with a geofence.
listDevices.{format}
http://sprintdevelopersandbox.com/developerSandbox/resources/v1/geofence/listDevices.{format}?{para ms}
Authentication
　　This method requires a generated MD5 signature.
Arguments
　　Key—Your API Key, click here to view.
　　fenceId—The ID of the fence whose recipients you want listed.
Timestamp—The current time of the request: [YYYY]-[MM]-[DD]T[HH]:[MM]:[SS] [ZZZ][HH] refers to a zero-padded hour between 00 and 23 (where 00 is used to notate midnight at the start of a calendar day).
Sig—The MD5 Digest value of the parameters of the geofence service and your secret.
Http Method
　　Get
Response
　　deviceId ID of the device associated with the fence.
　　mdn MDN of the fence device.
Example Request
　　Get
http://sprintdevelopersandbox.com/developerSandbox/resources/v1/geofence/listDevices?key=123abckey&fenceId=110×tamp=2010-03-05T10:12:00CST&sig=123abcdef456
Example Response
　　1(8165551111), 14(9135552121)
Add—This service is used to add a device to a fence.
addDevice.{format}
http://sprintdevelopersandbox.com/developerSandbox/resources/v1/geofence/addDevice.{format}?{para ms}
Authentication
　　This method requires a generated MD5 signature.
Arguments
　　Key—Your API Key, click here to view.
　　fenceId—The ID of the fence to add the device to.
　　Mdn—MDN of the device.
Timestamp—The current time of the request: [YYYY]-[MM]-[DD]T[HH]:[MM]:[SS] [ZZZ][HH] refers to a zero-padded hour between 00 and 23 (where 00 is used to notate midnight at the start of a calendar day).
Sig—The MD5 Digest value of the parameters of the geofence service and your secret.
Http Method
　　Get
Response
　　message Success message if device was added or an error message.
Example Request
　　Get
http://sprintdevelopersandbox.com/developerSandbox/resources/v1/geofence/addDevice?key=123abckey&fenceId=110&mdn=9135552121×tamp=2010-03-05T10:12:00CST&sig=123abcdef456
Example Response
　　DEVICE_ADDED
Delete—This service is used to delete an existing fence device.
deleteDevice.{format}
http://sprintdevelopersandbox.com/developerSandbox/resources/v1/geofence/deleteDevice.{format}?{par ams}
Authentication
　　This method requires a generated MD5 signature.
Arguments
　　Key—Your API Key, click here to view.
　　deviceId—The ID of the device to delete.

Timestamp—The current time of the request: [YYYY]-[MM]-[DD]T[HH]:[MM]:[SS][ZZZ] [HH] refers to a zero-padded hour between 00 and 23 (where 00 is used to notate midnight at the start of a calendar day).
Sig—The MD5 Digest value of the parameters of the geofence service and your secret.
Http Method
   Get
Response
   message Success message if device was deleted or an error message.
Example Request
   Get
http://sprintdevelopersandbox.com/developerSandbox/resources/v1/geofence/deleteDevice?key=123abck
ey&deviceId=217xtamp=2010-03-05T10:12:
00CST&sig=123abcdef456
Example Response
   DEVICE_DELETED
Some services may be used with respect to managing, and/or receiving notifications for one or more geofences. For example, the following services may be used and/or offered for such purposes in some embodiments:
List—This service is used to return all recipients associated with a geofence.
listRecipients.{format}
http://sprintdevelopersandbox.com/developerSandbox/resources/v1/geofence/listRecipients.{format}?{pa rams}
   Authentication
   This method requires a generated MD5 signature.
Arguments
   Key—Your API Key, click here to view.
   fenceId—The ID of the fence whose recipients you want listed.
Timestamp—The current time of the request: [YYYY]-[MM]-[DD]T[HH]:[MM]:[SS][ZZZ] [HH] refers to a zero-padded hour between 00 and 23 (where 00 is used to notate midnight at the start of a calendar day).
Sig—The MD5 Digest value of the parameters of the geofence service and your secret.
Http Method
   Get
Response
   recipientId: ID of the recipient associated with the fence.
   mdnURL: MDN or URL of the notification recipient.
Example Request
   Get
http://sprintdevelopersandbox.com/developerSandbox/resources/v1/geofence/listRecipients?key=123abck
ey&fenceId=110xtamp=2010-03-05T10:12:
00CST&sig=123abcdef456
Example Response
   112(8165551111), 146(9135552121), 327(http://www.notifymyapp.com)
Add—This service is used to add a recipient (may be either an MDN or URL) to a fence.
addRecipient.{format}
http://sprintdevelopersandbox.com/developerSandbox/resources/v1/geofence/addRecipient.{format}?{par ams}
Authentication
   This method requires a generated MD5 signature.
Arguments
   Key—Your API Key, click here to view.
   fenceId—The ID of the fence to add the recipient to.
   mdnURL—MDN or URL for the notification recipient.
Timestamp—The current time of the request: [YYYY]-[MM]-[DD]T[HH]:[MM]:[SS][ZZZ] [HH] refers to a zero-padded hour between 00 and 23 (where 00 is used to notate midnight at the start of a calendar day).
Sig—The MD5 Digest value of the parameters of the geofence service and your secret.
Http Method
   Get
Response
   message Success message if recipient was added or an error message.
Example Request
   Get
http://sprintdevelopersandbox.com/developerSandbox/resources/v1/geofence/addRecipient?key=123abck
ey&fenceId=110&mdnURL=9135552121xtamp=2010-03-05T10:12:00CST&sig=123abcdef456
Example Response
   RECIPIENT_ADDED
Delete—This service is used to delete an existing fence notification recipient.
deleteRecipient.{format}
http://sprintdevelopersandbox.com/developerSandbox/resources/v1/geofence/deleteRecipient.{format}?{params}
   Authentication
   This method requires a generated MD5 signature.
Arguments
   Key—Your API Key, click here to view.
   recipientId—The ID of the recipient to delete.
Timestamp—The current time of the request: [YYYY]-[MM]-[DD]T[HH]:[MM]:[SS][ZZZ] note: [HH] refers to a zero-padded hour between 00 and 23 (where 00 is used to notate midnight at the start of a calendar day).
Sig—The MD5 Digest value of the parameters of the geofence service and your secret.
Http Method
   Get
Response
   message Success message if recipient was deleted or an error message.
Example Request
   Get
http://sprintdevelopersandbox.com/developerSandbox/resources/v1/geofence/deleteRecipient?key=123ab
ckey&recipientId=217xtamp=2010-03-05T10:12:
00CST&sig=123abcdef456
Example Response
   RECIPIENT_DELETED
Perimeter Check—This service is used to determine if a device is inside a defined area, or "fence."
checkPerimeter.{format}
http://sprintdevelopersandbox.com/developerSandbox/resources/v1/geofence/checkPerimeter.{format}?{params}
Authentication
   This method requires a generated MD5 signature.
Arguments
   Mdn—The MDN of the device to be located.
   Key—Your API Key, click here to view.
   Lat—The latitude of the center of the geofence.
   Long—The longitude of the center of the geofence.
   Rad—The size of the fence in meters.
Timestamp—The current time of the request: [YYYY]-[MM]-[DD]T [HH]:[MM]:[SS][ZZZ] Note: [HH] refers to a zero-padded hour between 00 and 23 (where 00 is used to notate midnight at the start of a calendar day).
Sig—The MD5 Digest value of the parameters of the geofence service and your secret.

Figure 6:
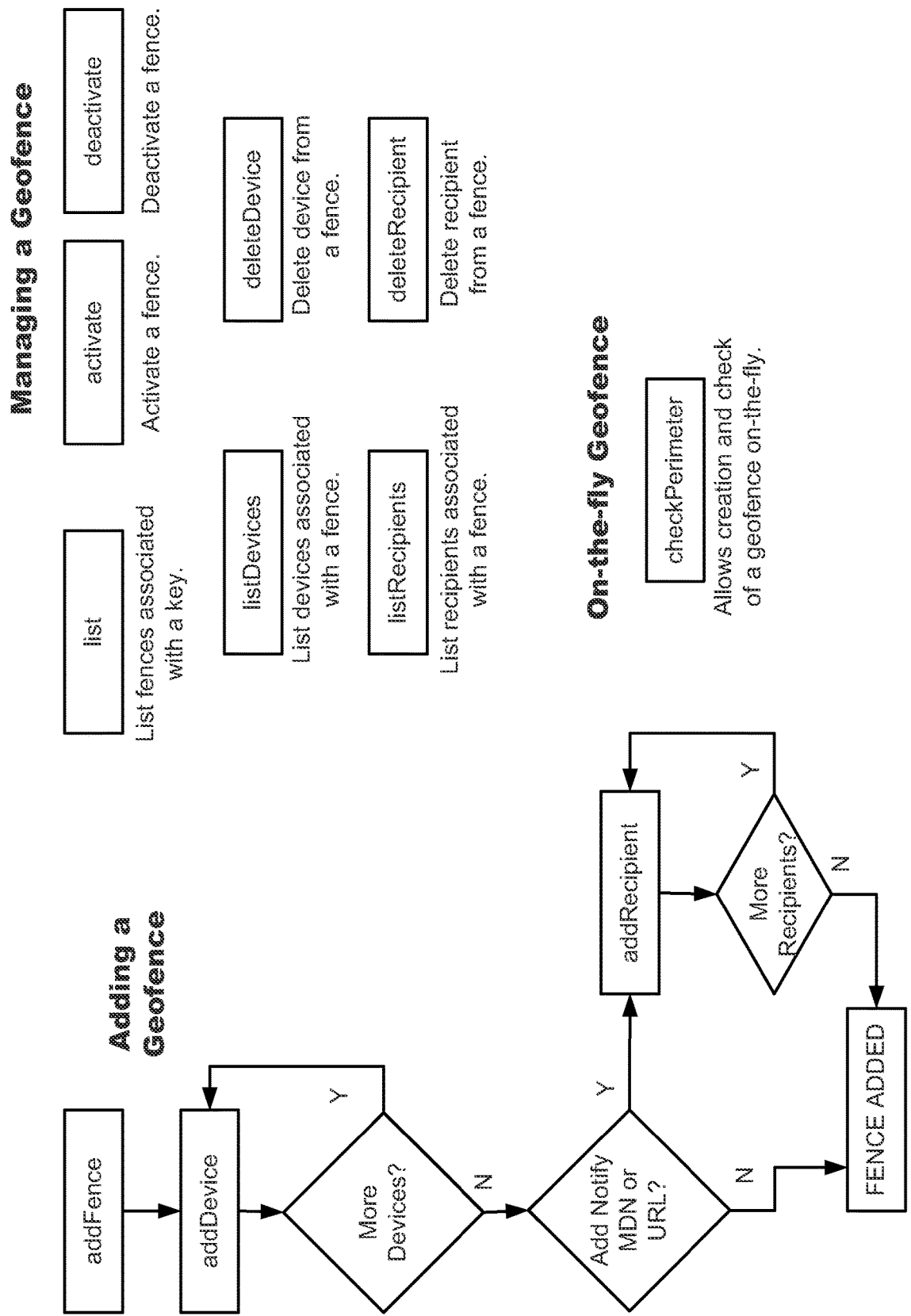
FIG. 6 shows some example processes that may be performed in some embodiments with respect to a geofence.
Figure 7:
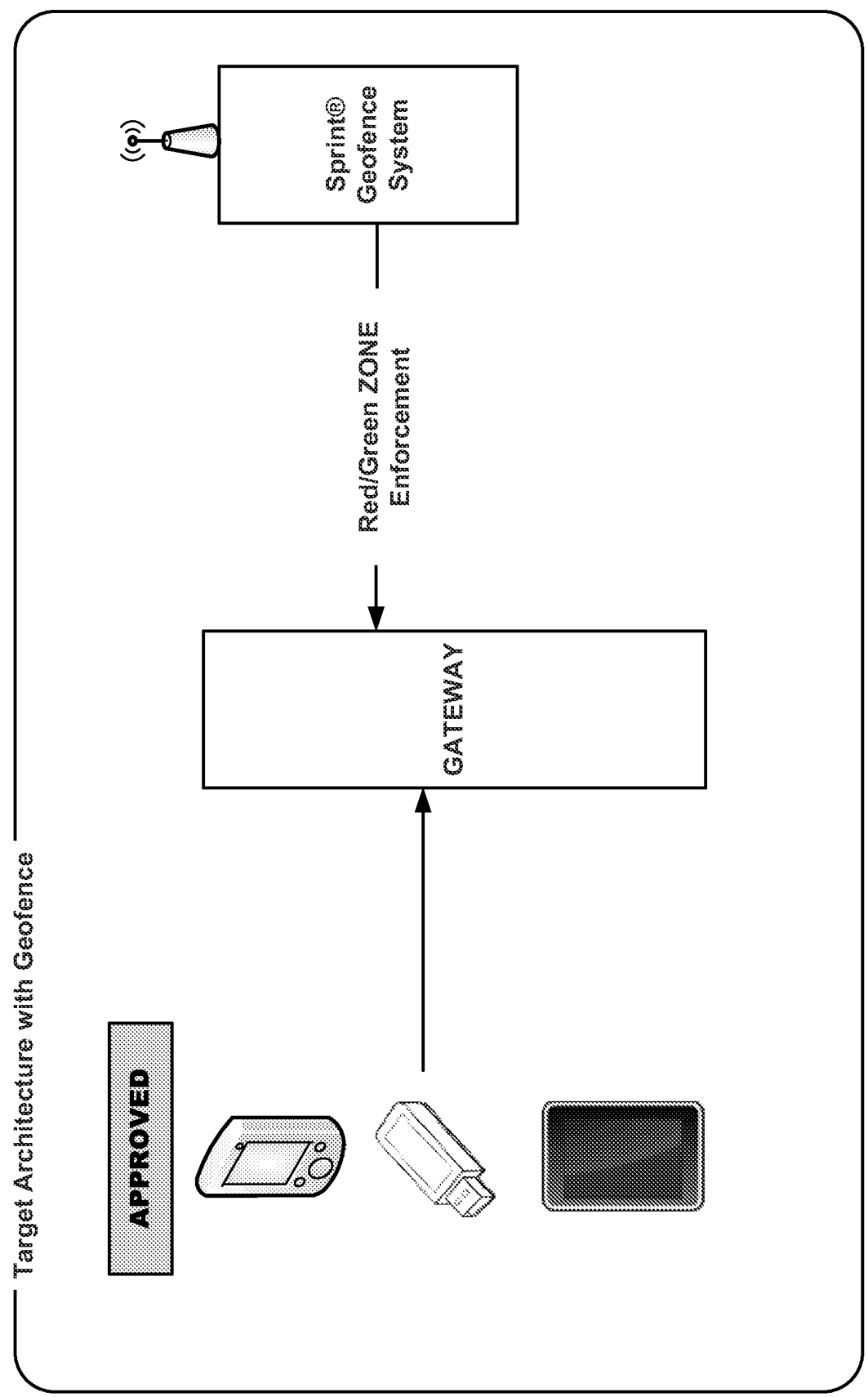
FIG. 7 some example processes that may be performed in some embodiments with respect to a geofence.

Http Method
   Get
Response
   Mdn—The mdn of the device that was located.
   latReq—The requested latitude for the center of the fence.
   lonReq—The requested longitude for the center of the fence.
   radReq—The requested radius of the fence, in meters.
   latRes—The actual latitude of the requested device.
   lonRes—The actual longitude of the requested device.
   Accuracy—The accuracy of the location fix for the device.
Status—The status of the request, meaning that if device is inside or outside of the fence.
Comment—Additional information pertaining to the fence, this is only displayed if there is an issue with one of your parameters, e.g. your radius is smaller than your accuracy.
Example Request
   Get
http://sprintdevelopersandbox.com/developerSandbox/resources/v1/geofence/checkPerimeter?key=123 abckey&mdn=9135555151&lat=38.917806&long=−94.659787&rad=5×tamp=2010-0305T10:12:00CST&sig=123abcdef456
Example Response
9135555151,38.917806,−94.659787,5.0,38.914948,−94.65723,0.0,OUTSIDE
Some embodiments may include one or more errors occurring with respect to a geofence. Some example errors that may occur include:
INVALID_LAT_LONG Latitude†Longitude is invalid.
INVALID_COORDINATES Coordinates are invalid.
INVALID_ACTION Action (i.e. checkPerimeter, add, addRecipient, etc) is invalid.
INVALID_KEY Key is invalid.
INVALID_FENCE Fence referenced is invalid.
INVALID_FENCE_ID Fence ID is invalid.
INVALID_RECIPIENT Recipient referenced isn't valid.
INVALID_TIME Time entered for fence isn't valid.
INVALID_LATITUDE Latitude is not valid.
INVALID_LONGITUDE Longitude is not valid
INVALID_RADIUS Radius isn't valid.
EXPIRED_KEY The API key has expired.
INVALID_MDN Not a valid 10 digit number.
LOCATION_ERROR A service exception occurred on the server side.
EXHAUSTED_DIPS You have exceeded your transaction limit.
GENERAL_FAILURE An unidentified error may have occurred.
Some embodiments may include one or more services, functions, processes, APIs and so on performed, used, and/or offered by a device, and/or system that may interface and/or otherwise use a geofencing technology. Some example functions may include:
Perimeter Check API—This service is used to determine if a device is inside a defined area, or "fence."
checkPerimeter.{format}
http://sprintdevelopersandbox.com/developerSandbox/resources/v1/geofence/checkPerimeter.{format}?{params}
Authentication
   This method requires a generated MD5 signature.
Arguments
   Mdn—The MDN of the device to be located.
   Key—Your API Key, click here to view.
   Lat—The latitude of the center of the geofence.
   Long—The longitude of the center of the geofence.
   Rad—The size of the fence in meters.
   Timestamp—The current time of the request: [YYYY]-[MM]-[DD]T[HH]:[MM]:[SS][ZZZ] Note: [HH] refers to a zero-padded hour between 00 and 23 (where 00 is used to notate midnight at the start of a calendar day).
   Sig—The MD5 Digest value of the parameters of the geofence service and your secret.
Http Method
   Get
Response
   Mdn—The mdn of the device that was located.
   latReq—The requested latitude for the center of the fence.
   lonReq—The requested longitude for the center of the fence.
   radReq—The requested radius of the fence, in meters.
   latRes—The actual latitude of the requested device.
   lonRes—The actual longitude of the requested device.
   Accuracy—The accuracy of the location fix for the device.
Status—The status of the request, meaning that if device is inside or outside of the fence.
Comment—Additional information pertaining to the fence, this is only displayed if there is an issue with one of your parameters, e.g. your radius is smaller than your accuracy.
Example Request
   Get
http://sprintdevelopersandbox.com/developerSandbox/resources/v1/geofence/checkPerimeter?key=123ab ckey&mdn=9135555151&lat=38.917806&long=−94.659787&rad=5×tamp=2010-03-05T10:12:00CST&sig=123abcdef456
Example Response FIG. 6 illustrates some example processes that may be performed in some embodiments with respect to a geofence. It should be recognized that this is given as an example only and that other embodiments may include other processes, other actions in any order performed by any device as desired. It should be recognized that various examples of services and/or functions are given as non-limiting examples only. Some such example processes may include creating a geofence, adding a device to be tracked by the geofence, subtracting a device, eliminating a geofence, changing a geofence, querying regarding a device and/or geofence, listing active and/or inactive geofences, activating a geofence, deactivating a geofence, and so on. Other embodiments may include other such features with different parameters, authentication requirements, arguments, responses, names, and so on FIG. 7 illustrates an example architecture that may be used in some embodiments for location determination. As illustrated, one or more mobile device may communicate with a gateway. Such a gateway may communicate with a location determination service. In some embodiments, the gateway may determine whether a location determination is desire d (e.g., in response to a wager, periodically, in response to a variable becoming invalid, etc.). The gateway may query the location service in response to determining that the location determination should take place. The location service may determine a location (e.g., a gps coordinate, a physical location, whether a device is in or out of a geofence, a distance to an edge of a boundary, etc.). The location service may transmit such location information to a gateway. The gateway may enable and/or disable a service as desired, store information about the location, and/or perform any desired actions in response to receiving the location information. It should be recognized that such an architecture and process are given as non-limiting examples only and that other embodiments may include any desired components of a gaming service, location service, communication service, and so on as desired in any combination performing any functions.

It should be recognized that examples of determining whether a device is in or out of a geofence are given as non-limiting examples only. Some embodiments may include any number of services to provide such features. For example, a third party may provide location services, a communication service provider may provide location services, a gaming service may provide location services, any aspect of a location determination may be performed in part or in whole by any entity desired.

Soft Tag Examples

In some embodiments, in addition to and/or as an alternative to geofencing, a softtag system may be used. Such a system may be used to determine whether a device is in an approved and/or an unapproved location for gaming. In some embodiments, such a system may be provided by Ekahau to determine approved and/or unapproved (e.g., red/green) zones.

In some embodiments, such a softtag may include a gaming positioning client software. Such software may be used, e.g., by a server, workstation, network, mobile device and/or processor, to facilitate determining information about a location or position of a mobile device. In some embodiments, such software may be used to identify a location of a user of a mobile and/or handheld device (e.g., a moveable processor, such as a handheld computer, mobile phone or smartphone, laptop, other portable electronic device, etc.). For example, software running on a mobile device may cause the device to transmit or otherwise provide information (e.g., to a server or other processor, a unique identifier, a set of signal strengths, etc.) that can be used to determine the position of the client mobile device.

In some embodiments, a gaming application (e.g., a main application, a wrapper application, a softtag application, etc.) may perform one or more actions to facilitate such features. For example, such an application may be assigned a unique identifier (e.g., as part of a sign up process). As another example, such an application may be provided with a list of allowed access points and/or a reference to where such a list may be obtained (e.g., from a gaming service). In some embodiments, such a gaming application may determine one or more signal strengths form one or more wireless access points and/or one or more access point identifiers that may be accessed from a current location). In some embodiments, an application may determine a network to which the mobile device is accessing a gaming service (e.g., a wifi network at a casino, a wifi network at a Starbucks in Las Vegas, and so on).

In some embodiments, one or more identifiers and/or signal strengths may be transmitted to a gaming service and/or other location (e.g., with a request to gamble). In some embodiments, an identifier of such a network may be used to determine that the network is approved. For example, the network identifier may be compared with a listing of allowed networks (e.g., by a gaming service, by a mobile device, by the application). If the network is in the list, then the network may be in an approved location and gaming may be allowed. In some embodiments, a request to a gaming service may include an identification of the network so that such a determination may be made by the gaming service. In some embodiments, a set of signal strengths and/or access point identifiers may be used to determine if a location is approved. For example, a set of signal strengths and/or access points may be compared to a set of approved signal strengths and/or access points. Some example embodiments of such comparisons are described in U.S. patent application Ser. No. 12/197,809, which is hereby incorporated herein by reference.

Some embodiments may include determining that a network is in an allowed location and/or identifying allowed signal strengths and/or access points. For example, some embodiments may include an agent identifying that a network, access points, and/or signal strengths are in a allowed location to a gaming service (e.g., an agent may observe a boundary of a network and determine that the network is within a boundary of an allowed location, the agent may send a message to a gaming service identifying that communication network and that it is in an allowed location, the agent may determine that signal strengths and/or access points at various locations are valid and/or invalid based on the location compared to legal requirements). In response to receiving such information, a gaming service may associate the communication network, signal strengths, and/or access points with being in an allowed location.

Such an application may run on any supported operating system or systems. Such operating systems may include any operating systems for computers, servers, handheld devices, and/or other devices. Such supported operating systems may include Windows operating systems such as Mobile 5 PocketPC, Windows Mobile 6 Classic, Windows Mobile 6 Professional, and other operating systems, Mac operating systems, Linux, and other systems.

In some embodiments, the software may be capable of accomplishing various functions and have various features, including (but not limited to) one or more (or all) of the following, e.g., in some embodiments: support client maintenance, e.g., from a Positioning Engine (e.g., a position engine provided by the company Ekahau); adjust scan settings, e.g., for multiple devices, e.g., at the same time (or at multiple different times); display battery level status (e.g., from Ekahau Engine); does not require Ekahau Client Connector; Supports Ekahau RTLS 4.x Location and Maintenance Protocols (ELP, EMP); includes a new user interface in the PPC Client: PPC Client settings are maintained using Ekahau Positioning Engine; Laptop Client may not have a UI: settings are set in the installer or settings are maintained using Ekahau Positioning Engine; and/or may or may not affect association/authentication.

Various examples of determining a time period for rechecking a location are given elsewhere with respect to a geofencing embodiment. Such feature may apply to a softtagging or other embodiment. For example, particular networks, access point and/or signal strength sets may be associated with different time periods between location checks based on a distance form an edge of a boundary of an approved area, a state, a reliability, and so on. Similarly, speed of movement may be used to determine such time periods in some embodiments.

It should be recognized that various examples of softtagging are given as non-limiting examples only and that other methods and/or apparatus may be used as desired. Any desire location services may be used in combination and/or exclusively. For examiner, some embodiments may include determining that a device is both using an approved network and in a geofence.

Location Affinity Examples

Some embodiments may include associating a particular location with one or more advertising elements, available games, user interfaces, skins, user accounts, and so on. For example, in some embodiments, a user that is in the M Resort may be allowed to play games (e.g., sports wagers, and/or casino games) that may be allowed by the M Resort. For example, the user may be limited to only games that are offered by the M, approved by the M, have an M skin, and/or are otherwise limited and/or customized based on being located within the M Resort. In some embodiments, a user may be limited to using an account at the M Resort when located in the M Resort. In some embodiments, a user may be limited to selecting an M Resort account from a list of accounts from which to place wagers, an M Resort App, an M Resort menu item from a menu of gaming items, and/or other elements related to the M Resort when in the M Resort. In some embodiments such restriction may apply to a particular type of gaming such as casino gaming but may not to another type of gaming, such as sports gaming For example, in some embodiments, if a user is in a geofence that is around the M Resort, the user may be determined to be in the M Resort. For example, one of the geofences described above may be around the M Resort and a query result from a location service may indicate whether the user is in or out of that particular geofence to be used by a gaming service to determine whether the user is in or out of the M Resort. In some embodiments, if a user is accessing an M Resort communication network for gaming (e.g., an M Resort wifi network), the user may be determined to be in the M Resort. In response to being determined to be in the M Resort, features may be enabled and/or disabled as desired (e.g., a user may be prevented from logging into a non-M Resort account.

In some embodiments, determining a location may be performed using geofencing such that a first geofence around a casino and a second geofence around a city may be used. For example, such a concentric geofencing may allow for a user in a casino to be limited to things approved by the casino, but a user outside of the casino to be allowed to use things approved outside the casino, which may include more, fewer, same, and/or different things than those approved in the casino. For example, more than one type of gaming may be allowed outside the casino, such as sports wagers from multiple books not just the M Resort and/or casino games using money from accounts not located at the M Resort.

In some embodiments, as an alternative and/or addition to determining location based on geofencing a determination of allocation may be based on available communication networks. For example, one or more determinations may be made by a software application of a device as to whether one or more wireless networks or other communication networks from a set of pre-approved networks are available. Each such preapproved communication may be associated with a particular location. If a wireless network of the set of wireless networks is available, then the device may be required to establish a connection to that network in order to play a game. Access to gaming through any other network such as a cellular network that may also be available may be prohibited when one or more of the pre-approved networks are available. Accordingly, in some embodiments when inside of a casino such as the M Resort that may offer a wireless connection to an M Resort network that is associated with being in the M Resort, a device may determine that the pre-approved M Resort network is available. The device may stop access to a cellular network for gaming purposes in response to determining that the pre-approved network is available. The device may connect to the M Resort network in response to determining that the M Resort network is available. Limitations, abilities, restrictions and so on associated with being in the M Resort may be associated with gaming using the M Resort network, and therefore, the device. Such limitations may be imposed upon the device by the device, by a server to which the device connects, by a gateway through which the device connects, and/or in any other way. For example, in some embodiments, based on an SSID on the network, a gateway server may limit available accounts that may be signed into, based on the account signed into, a central server may limit available gaming options, based on the SSID of the network, a device may apply a skin and/or restrictions, based on an SSID a central server may apply limitations, and so on.

Such information about networks and/or locations may be used to distribute winnings, direct advertising, prevent users form becoming angry or feel cheated by a casino in which they are located even though they are playing games that may be offered through another casino, and so on.

In some embodiments, to accomplish such network limited functionality, a device may be configured to check for an availability of one or more pre-approved communication networks, such as a Wi-Fi connection (e.g., by a gaming application, a wrapper application, etc.). Such checking may take place periodically, continually, randomly, on demand, and so on. When any one of those pre-approved communication networks is available, the device may connect to that instead of any other network s. If multiples are available then a strongest signal or otherwise preferred network may be used.

In some embodiments, to continue ensuring that no remote control is used through a Wi-Fi_33 connection so that a player is physically present, when gaming through a cellular network, the Wi-Fi_33 may be disabled for actual data receipt and/or connection unless and/or until such a pre-approved network is detect, a Wi-Fi_33 connection may be turned on for mini boosts only to check if the network is available (in some embodiments, during which time the other gaming may be suspended), a Wi-Fi_33 device may be on but unable to connect to any network accept the preapproved networks, a Wi-Fi_33 device may be controlled by a proprietary software that limits access to any networks other than the preapproved networks, and so on.

When a pre-approved network is detected a cellular network may be no longer available for gambling through a gaming application (e.g., the application may be notified of the availability and disconnect from or otherwise limit access to a gaming server through the cellular network, a gaming server may be notified and limit access to games, and so on). The user may be prompted to login through the Wi-Fi_33 network and/or may automatically be logged in through such a network instead. Similarly when the Wi-Fi_33 network is no longer available, if the cellular network is available, the user may be prompted to login there and/or may be automatically logged in there instead.

A start up process that may be performed before gaming is allowed on a mobile device in such an embodiment may require that Wi-Fi_33 be enabled throughout the use of the device, may require that a Wi-Fi_33 diagnostic be passed, may require that an approved application has control over a Wi-Fi_33 device, and so on. If no approved Wi-Fi_33 network is available, the cellular network may be used to gamble such as described elsewhere herein, for example.

It should be recognized that various examples of location service and/or location affinity are given as non-limiting examples only.

Limiting Remote Control of Mobile Device Examples

In some embodiments, an ability to remotely access a cell phone may be controlled. Such an ability may be restricted, prevented, and/or not available, for example. In some embodiments, one or more methods and/or devices may be used to prevent remote connections to a mobile device while a customer is performing wagering related activities using the mobile device and/or if the mobile device is authorized to perform wagering activities.

Some example mobile devices may include any number of communication interfaces (e.g., 4) that may be controlled to prevent remove access of the mobile device. It should be recognized that some embodiment may include more, fewer, different such interfaces and that the example interfaces are given as non-limiting examples only. Such example interfaces may include 1. Wi-Fi, 2. Dock/USB, 3. Blue tooth, 4. Cellular Network (may not support incoming connections).

In some embodiments, incoming remote connections to a mobile device may be disabled, may not be possible and/or my otherwise may be prevented over a cellular network connection. In some embodiments, one or more communication interfaces may be disabled at a time relative to when a player performs wagering related activities (e.g. places a wager). In some embodiments, such disabling may include preventing a customer from remotely controlling a phone so that the customer may be at the location of the phone when the wagering activity takes place. In some embodiments, if while in the sports betting application, the customer enables a disabled communication interface, and/or a remote connection is made through such an interface, in response to determining that such an enabling occurs and/or such a connection being made, a customer's sports betting session may be terminated and/or disabled (e.g., with a warning message, without a warning message, a sports wagering application may be terminated, a communication session may be terminated, a gaming service may be notified, and so on).

In some embodiments, a mobile gaming application may make check to determine whether a communication interface is enabled and/or whether a communication session through such an interface is active. For example, an application may occasionally, in response to an action, periodically, and so on check if a communication interface is enabled and/or if a communication session is active. Such a checking may be made by calling one or more APIs. For example, an Android OS API may be used. Some examples of such APIS may include:

Class: UiModeManager
public int getCurrentModeType ( )
Since: API Level 8
Return the current running mode type. May be Configuration.UI_MODE_TYPE_NORMAL, Configuration.UI_MODE_TYPE_DESK, and/or Configuration.UI_MODE_TYPE_CAR
May check if device is docked or connected to USB
Class: WifiManager
public boolean isWifiEnabled ( )
Since: API Level 1
Return whether Wi-Fi is enabled or disabled.
Returns true if Wi-Fi is enabled
See Also
getWifiState( )
May check if WIFI is enabled
Class: BlueToothAdapter
public boolean isEnabled ( )
Since: API Level 5
Return true if Bluetooth is currently enabled and ready for use.
Equivalent to: getBluetoothState( )==STATE_ON
Requires BLUETOOTH
Returns true if the local adapter is turned on In some embodiments, a wagering application on a client device may include one or more programs A first application may include, for example, an AIR 2.5 application built on Android 2.2 platform using Flash AS3. A second application may include, for example an Android wrapper application that launches and monitors the current device status. In some embodiments, a customer facing application may include a launcher that may launch the AIR 2.5 application after checking the status of remote connection access points such as Wi-Fi, Bluetooth and dock. The application may be launched if all external connection methods are disabled. Once successfully launched, if the customer enables one or more of these access points, the application may terminate. If the compliance validator service terminates and cannot provide status to the application, the application may terminate.

Some embodiments may prevent a user from making and/or accepting phone calls. For example, an application may be closed if a phone call is made and/or received during a gaming session and/or while a gaming application is being executed. In some embodiments, a user may be prevented from changing a focus, running multiple applications, running other applications, and so on while a gaming application is executed. It should be recognized that any desired set of actions may be made to prevent remote access as desired.

It should be recognized that various examples of application are non-limiting and that other embodiments may include a single application, any number of applications, no applications, any language, any technology, any devices, any operating systems, and so on.

Example Components

Some embodiments may include one or more actors, programs, devices, servers, components, entities, architectures, and so on. Some examples may include:

A customer and/or mobile device user, a customer service agent associated with a gaming operator that may be located at a gaming related property, a customer service help desk that may be accessible via a toll-free number for assistance to mobile customers (e.g., help desk information may be displayed to customer whenever any validation fails), an Android Wrapper Application (e.g., an application written in the Android OS language and/or other language used to authenticate device and monitor phone status), an AIR Mobile gaming Client (e.g., a NGCB approved Adobe Flash application installed on the phone that may be the current user interface to allow customers to sign-in, play mobile gaming, and view account history), a Device Authenticator Service (e.g., an SSL secured service that provides the mechanism for the Android Wrapper application to authorize the phone, a provider of an internal (i.e. only accessible inside the firewall) interface to validate requests made to systems from approved devices), a gateway (e.g., an SSL secured NGCB approved middleware communication service that proxies requests to DAS and the account based mobile gaming system), a Win32 Wrapper Application (e.g., an Application written in the Win32 language used to authenticate device and monitor PC status. It should be recognized that Win32 language and PCs are given as non-limiting examples only and that that any technology may be used as desired. In some embodiments, a mobile device may include a data adapter, a mobile phone, a smart phone, a laptop, a pda, and so on.

Figure 8:
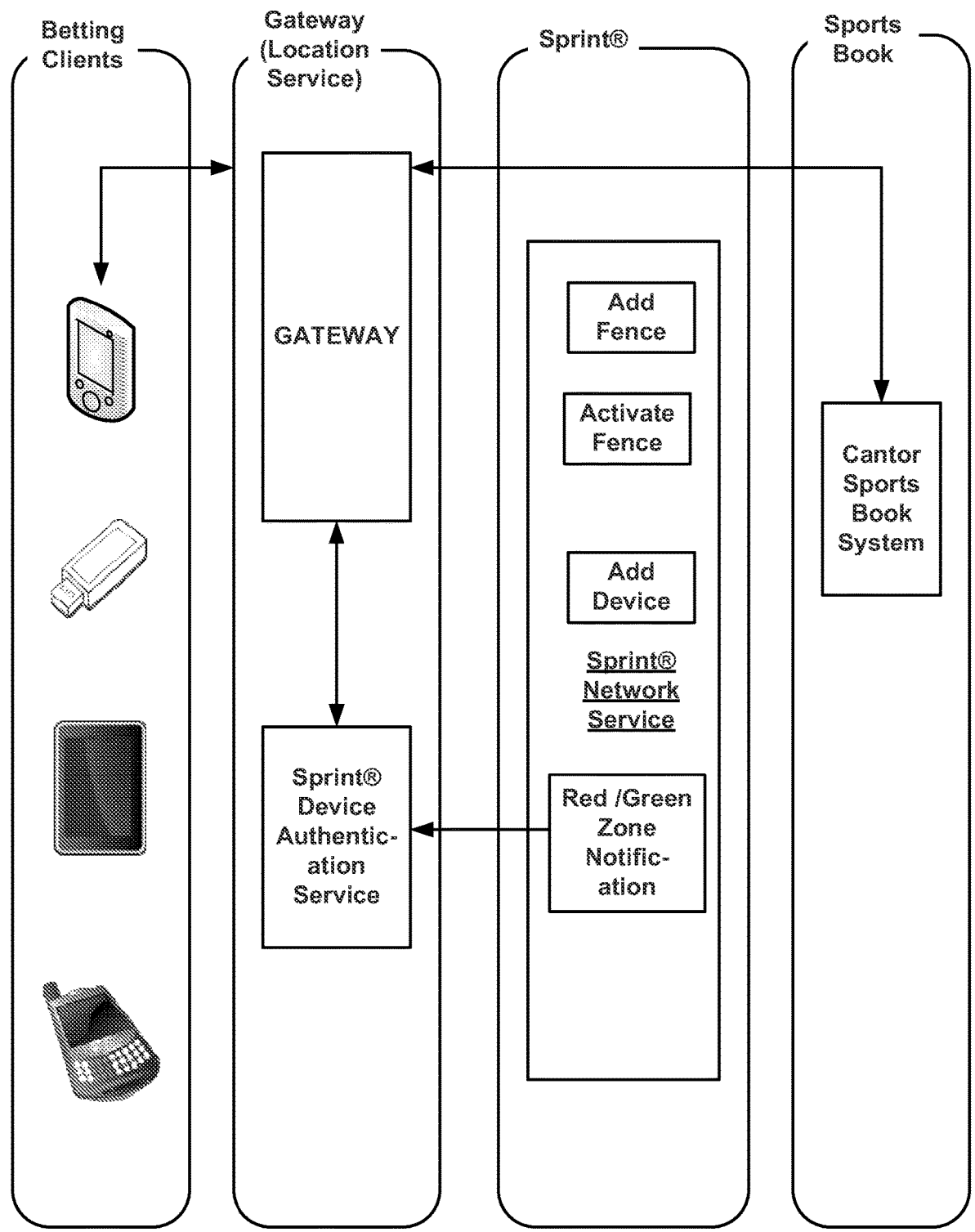
FIG. 8 shows an example architecture that may be used in some embodiments for location determination.

FIG. 8 illustrate example architectures that may be used in some embodiments. Some embodiments may include a mobile device as indicated. Such a device may communicate with a gaming service (e.g., a gateway). Such a device may be used by a customer to enter wagers, select games to play, choose decisions in a game, log into an account, and so on. Some embodiment may include such a gateway and/or any desired components of a gaming service and/or third party services that may be in communication with a mobile device. Such a component may perform any desired actions (e.g., authentication, location, and so on). Some embodiments may include a location service. Such a location service may provide any desired actions related to determining if a mobile device is in an approved location. Such a location service may communicate with a mobile device and/or gaming service. Such a location service may include a communication provider for the mobile device, a gaming service itself, a third party, and so on. Some embodiments may include a gaming component. Such a gaming component may be used to place bets, determine wager results, track accounts, and so on. Such a wager component may be part of a gaming service provider. Such a gaming component may receive wagers, determine wager results, receive actions to take in a game, facilitate play of a game, transmit indications of a result of an action, facilitate adjustments to an account in response to such results, and so on.

The figures illustrate that some actions may be performed by some devices. It should be recognized that any desired actions may be performed by any devices in other embodiments. It should be recognized that any desired computing devices in any combination may be used in other embodiments.

Some embodiments may use MD5 hashing and/or any desired encoding scheme to encode information, such as system parameters. Information about MD5 hashing may be found at http://en.wikipedia.org/wiki/MD5. MD5 may include a message digest algorithm for encoding data. MD5 may help to ensure that 1) Once encoded, the data cannot be retrieved via forms of decoding (i.e. the original data is lost) 2) MD5 Hashing two different pieces of data (even if they're quite similar) produces different results and/or 3) MD5 Hashing identical data will produce the same result.

Some embodiments may use an SSL HTTPS protocol to facilitate secure communication between entities. In some embodiments, communication between client devices and DAS, gateway, and/or a component of a gaming service may be performed using via the SSL HTTPS protocol. This may ensure data integrity and/or security. Information about the HTTPS protocol may be found at http://en.wikipedia.org/wiki/Https.

Some embodiments, such as those that may use an Android OS, may use private key signing to secure applications. For example, the OS may ensure: 1) two applications signed with different private keys cannot write to the data store of the other and/or 2) two applications signed with the same private key can write to the data store of the other. Information about such security may be found at http://developer.android.com/guide/topics/security/security.html.

Some embodiments, such as those that us Win32, may use process ids to secure applications. For example, a Win32 wrapper application may ensure: 1) two applications are running under the same user id and/or 2) Two applications are the only two processes running under the same user id.

Such examples are given as non-limiting only. It should be recognized that various embodiments may include any desired actors, programs, devices, servers, components, entities, architectures, and so on in any desired combination.

Examples of Gaming Rules

Some embodiments may operate in compliance with one or more rules. It should be recognized that any rules and/or no rules may be used as desired. Any number of mechanisms, punishments, validations, and so on may be used to ensure that any one or more of the rules are followed. Some examples rules may include:

1. Wagers are accepted within the approved geofences within the state of Nevada per Regulation 22.140 and Regulation 266.160. Nevada law prohibits wagers originating from outside the State of Nevada so such wagers may not be permitted. Accountholders may understand that it is illegal to place a wager originating outside the State of Nevada.

2. Applications for wagering may be made in person at a race and/or sports book. Applicants may complete the approved account based wagering application and provide acceptable valid proof of identification, and/or social security number, per Regulation 22 and 26c.

3. Account applicants may be twenty-one (21) years or older.

4. Account transactions may be made by the account holder. Accounts may be limited to the use of the individual named on the application. Account deposits and withdrawals may be made in person. Agents or other representatives may not be permitted.

5. A minimum $100.00 deposit may be made to open an account. Deposits to the accounts may be made in cash. Wire transfers may be made to a patron's account in accordance with Nevada Gaming regulations.

6. Account deposits and withdrawals may be signed and authorized by the guest at the race and sports book during normal business hours. No agents or representatives may be allowed.

7. Account withdrawals and subsequent deposits may be made at the location where the funds were initially placed on deposit.

8. Account patrons may be required to provide their account number and acceptable valid identification when conducting account transactions in person.

9. Wagers may not be accepted if they exceed the account balance.

10. Wagers may be subject to established wagering limits.

11. Rules, upon regulatory review, may be subject to change at any time.

12. Minimum deposit may include $100, and minimum wager may include $5.

13. Any desired house rules and/or regulations may apply to wagering accounts.

14. Patrons may be provided, within a reasonable amount of time, a statement of their account showing wagering account deposits, wagering account withdrawals, credits to a wagering account, and/or debits to the wagering account made during the time period reported by the account statement. The request for such information may be done in writing and be signed by the patron whose signature on the request will be verified. Within the request, the patron may furnish details on the dispensing of the requested information. All postal mailing may be done via regular mail to the address requested by the patron. If the request by the patron is to personally receive the information, the information may be given to the patron, who may provide valid identification when receiving the information. The information may not be personally released to anyone but the patron who holds the account unless required by law or court order.

15. Patrons may dispute any transaction according to Nevada Gaming Commission Regulation 7A.

16. Casinos may make a print, electronic or other approved record of each sports transaction and may not accept any such wager or transaction if the recording system is inoperable. Recorded wagering transactions may be maintained for 60 days, per Regulation 22 and 26c. The record of the patron's confirmation of all wagering information may be deemed to be the transaction of record, regardless of what was recorded by the computerized bookmaking or pari-mutuel system. The records may be made available to the Nevada Gaming Control Board upon request.

17. Guests may acknowledge that a wager placed using the system is binding on both parties only when the BET IS APPROVED on the system or the message "BET HAS BEEN ACCEPTED" is displayed.

OTHER EMBODIMENTS

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

What is claimed is:

1. An apparatus comprising:
   a memory;
   at least one processor to:
   determine whether a device is located within a jurisdiction where sports wagering is permitted;
   allow a sports wagering session to start on the device based at least partially on the device being located within the jurisdiction where sports wagering is permitted;
   determine a distance between the device and a border of the jurisdiction;
   repeat a location determination of the device after a period of time has expired, wherein a length of the period of time is based on the distance between the device and the border of the jurisdiction; and
   permit the sports wagering session to continue on the device, in response to the determination that the device is still located within the jurisdiction where sports wagering is permitted.

2. The apparatus of claim 1, in which the at least one processor is further configured to halt the sports wagering session on the device, in response to determining that the device is no longer located within the jurisdiction where sports wagering is permitted.

3. The apparatus of claim 1, in which the at least one processor is further configured to identify which communication interfaces are disabled on the device.

4. The apparatus of claim 1, in which the at least one processor is further configured to allow the sports wagering session to start on the device based further on determining that unauthorized communication interfaces are disabled on the device.

5. The apparatus of claim 1, in which the at least one processor is further configured to receive a login and password and allow the sports wagering session to start on the device based further on an authentication of the login and password.

6. The apparatus of claim 1, wherein the at least one processor is further configured to decrease the length of the period of time as the distance between the device and the border of the jurisdiction decreases.

7. The apparatus of claim 1, wherein the at least one processor is further configured to increase the length of the period of time as the distance between the device and the border of the jurisdiction increases.

8. The apparatus of claim 1, wherein the at least one processor is further configured to calculate the length of the period of time based on a speed of the device.

9. The apparatus of claim 1, wherein the at least one processor is further configured to calculate the length of the period of time based on a speed of the device and a direction of the device.

10. A method comprising:
    determining, by at least one processor, whether a device is located within a jurisdiction where sports wagering is permitted;
    allowing, by the at least one processor, a sports wagering session to start on the device based at least partially on the device being located within the jurisdiction where sports wagering is permitted;
    determining, by the at least one processor, a distance between the device and a border of the jurisdiction;
    repeating, by the at least one processor, a location determination of the device after a period of time has expired, wherein a length of the period of time is based on the distance between the device and the border of the jurisdiction; and
    permitting, by the at least one processor, the sports wagering session to continue on the device, in response to the determination that the device is still located within the jurisdiction where sports wagering is permitted.

11. The method of claim 10, further comprising halting, by the at least one processor, the sports wagering session on the device, in response to determining that the device is no longer located within the jurisdiction where sports wagering is permitted.

12. The method of claim 10, further comprising identifying, by the at least one processor, which communication interfaces are disabled on the device.

13. The method of claim 10, further comprising allowing, by the at least one processor, the sports wagering session to start on the device based further on determining that unauthorized communication interfaces are disabled on the device.

14. The method of claim 10, further comprising receiving, by the at least one processor, a login and password and allowing, by the at least one processor, the sports wagering session to start on the device based further on an authentication of the login and password.

15. The method of claim 10, further comprising decreasing, by the at least one processor, the length of the period of time as the distance between the device and the border of the jurisdiction decreases.

16. The method of claim 10, further comprising increasing, by the at least one processor, the length of the period of time as the distance between the device and the border of the jurisdiction increases.

17. The method of claim 10, further comprising calculating, by the at least one processor, the length of the period of time based on a speed of the device.

18. The method of claim 10, further comprising calculating, by the at least one processor, the length of the period of time based on a speed of the device and a direction of the device.

* * * * *